(12) United States Patent
Taguchi et al.

(10) Patent No.: US 8,046,615 B2
(45) Date of Patent: Oct. 25, 2011

(54) MICROCOMPUTER SYSTEM WITH REDUCED POWER CONSUMPTION

(75) Inventors: Shinichirou Taguchi, Nukata-gun (JP); Kenji Yamada, Gamagori (JP); Akimitsu Inoue, Toyota (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 463 days.

(21) Appl. No.: 12/285,481

(22) Filed: Oct. 7, 2008

(65) Prior Publication Data

US 2009/0106572 A1 Apr. 23, 2009

(30) Foreign Application Priority Data

Oct. 19, 2007 (JP) ................................. 2007-272256
Jun. 3, 2008 (JP) ................................. 2008-145773

(51) Int. Cl.
*G06F 1/32* (2006.01)
*G06F 1/04* (2006.01)

(52) U.S. Cl. ........ 713/322; 713/320; 713/324; 713/600; 713/601

(58) Field of Classification Search .......... 713/320–330, 713/501, 601
See application file for complete search history.

(56) References Cited

U.S. PATENT DOCUMENTS

| 5,737,588 | A | 4/1998 | Maeda et al. |
| 6,353,351 | B1 | 3/2002 | Aikawa |
| 7,243,250 | B2 * | 7/2007 | Ueda ............................ 713/323 |
| 7,831,847 | B2 * | 11/2010 | Chen et al. .................... 713/300 |
| 2006/0075267 | A1 | 4/2006 | Tokue |
| 2010/0275048 | A1 * | 10/2010 | Ishikura et al. ............... 713/323 |

FOREIGN PATENT DOCUMENTS

| JP | A-63-049861 | 3/1988 |
| JP | A-08-063405 | 3/1996 |
| JP | A-2001-154763 | 6/2001 |
| JP | A-2003-223430 | 8/2003 |
| JP | A-2006-164036 | 6/2006 |
| JP | A-2006-221381 | 8/2006 |

OTHER PUBLICATIONS

Office Action mailed Oct. 13, 2009 in corresponding Japanese patent application No. 2008-145773 (and English translation).

* cited by examiner

*Primary Examiner* — Glenn A Auve
(74) *Attorney, Agent, or Firm* — Posz Law Group, PLC

(57) ABSTRACT

A sub-microcomputer having a sub-CPU and a power supply control section that controls the power supply to a main microcomputer is disposed in addition to the main microcomputer having a main CPU. A sub-clock section that supplies a sub-clock signal having a lower frequency to the sub-microcomputer can change over between a continuous mode and an intermittent mode. When the main CPU gives an operation stop notification to the sub-CPU, the sub-CPU recognizes the notification, stops the power supply to the main microcomputer, and sets the sub-clock section to the intermittent mode. The sub-CPU determines that the operation state condition is satisfied in the period of the intermittent mode, the sub-CPU changes over the sub-clock section to the continuous mode to restart the power supply to the main microcomputer.

32 Claims, 15 Drawing Sheets

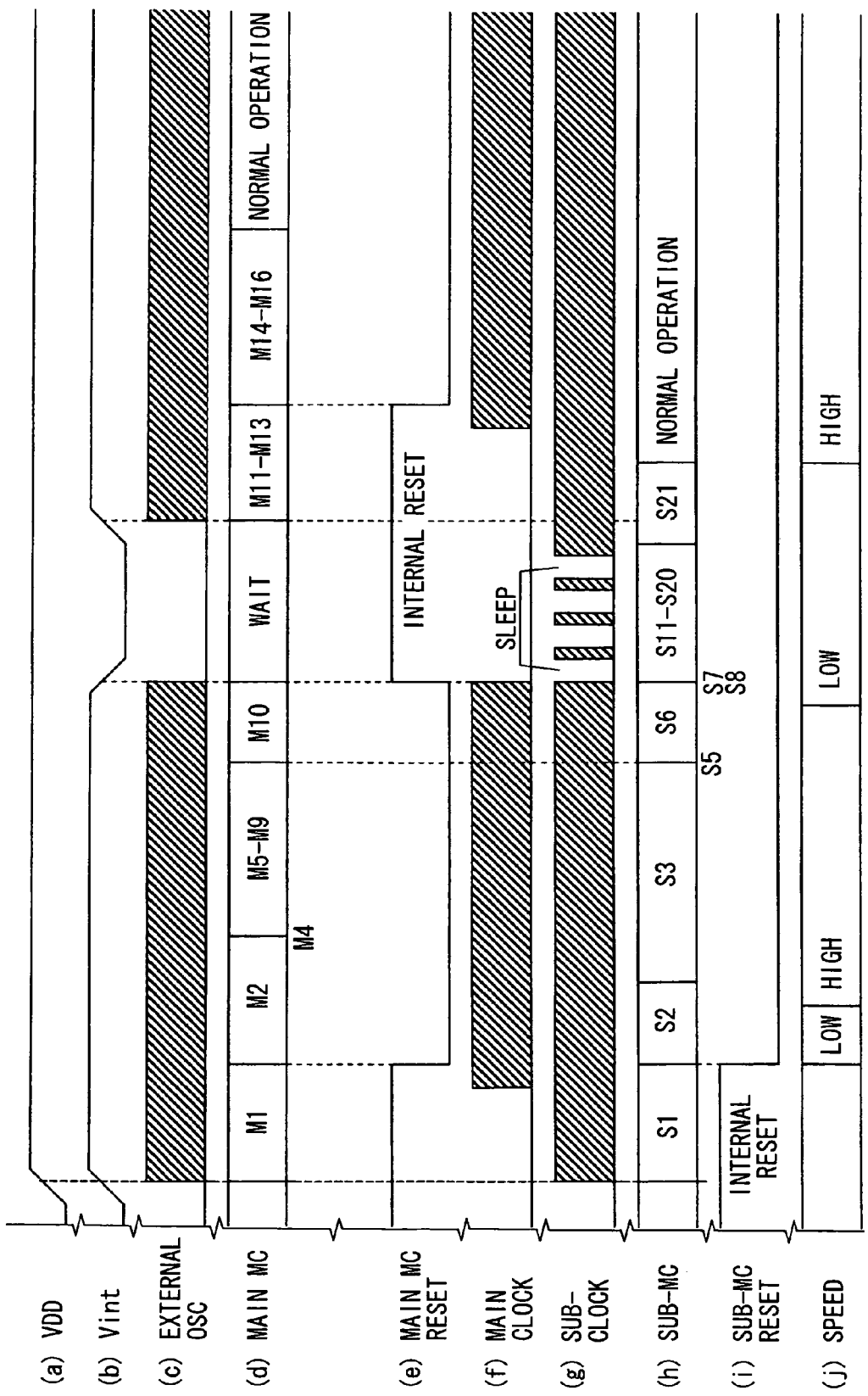

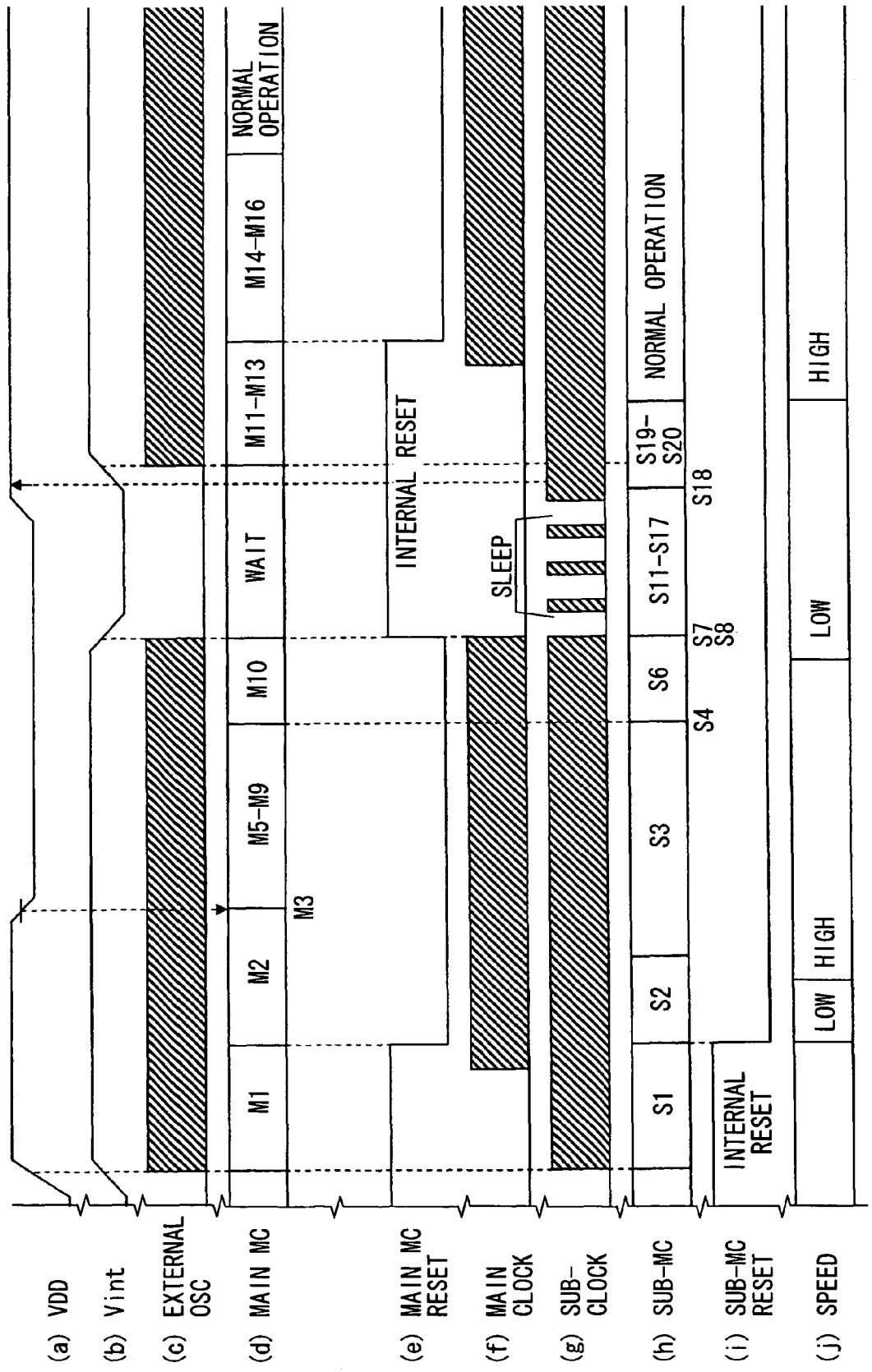

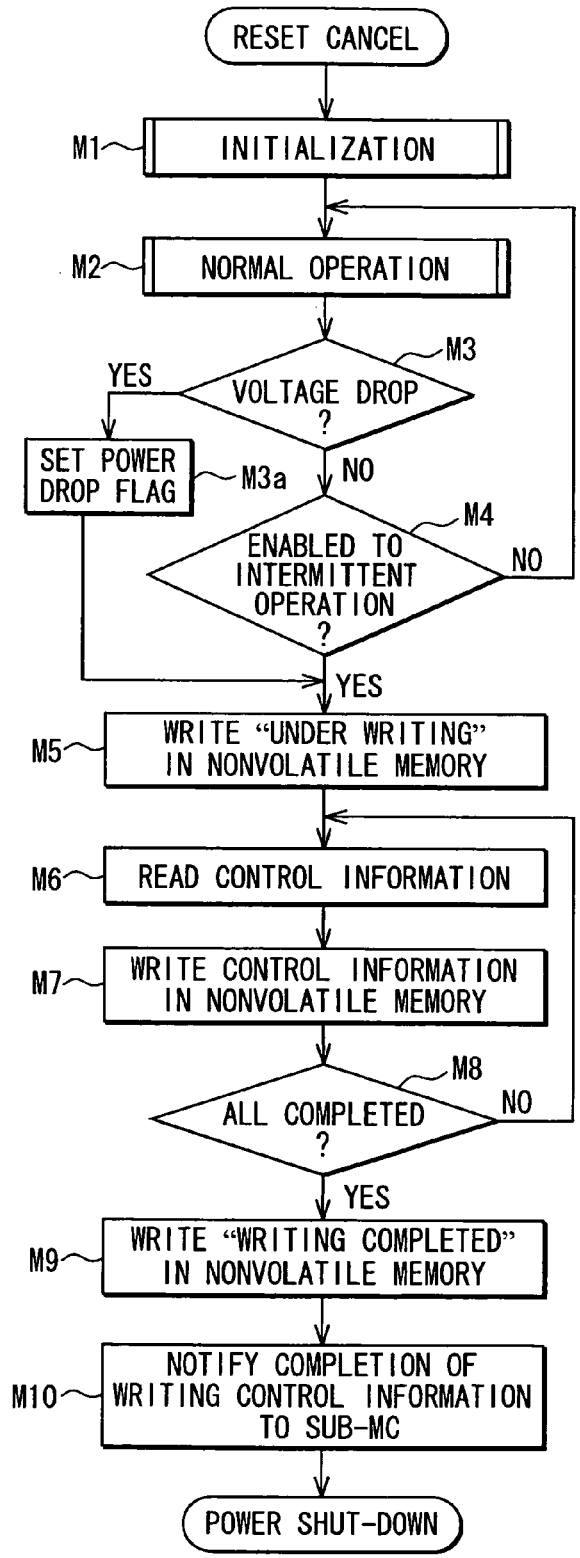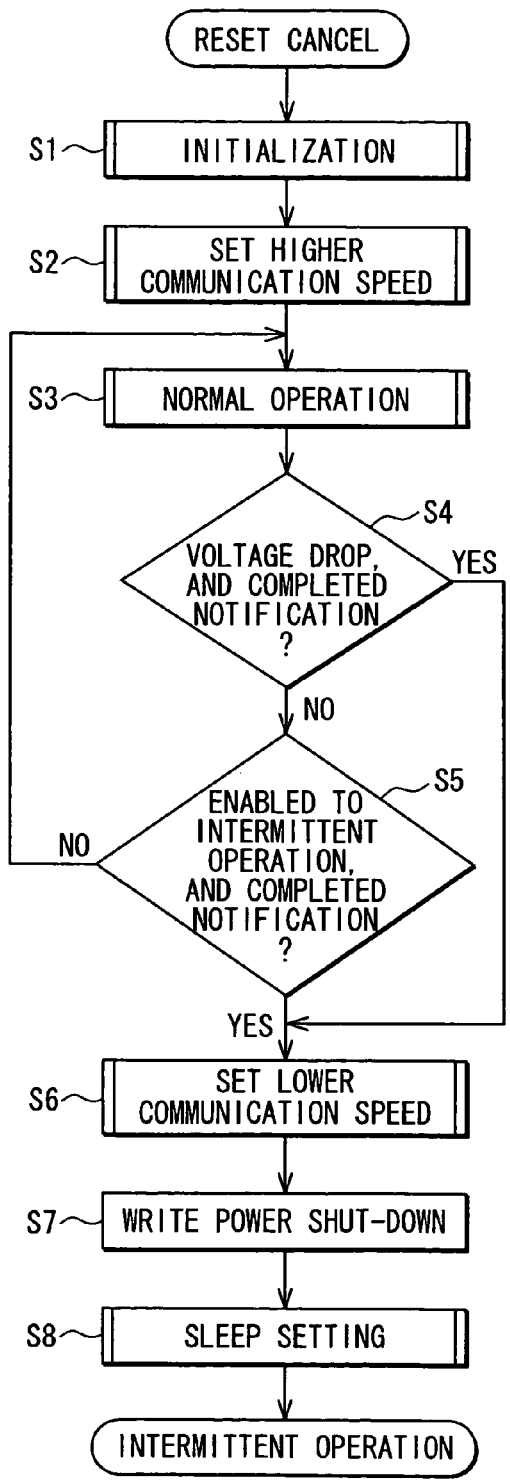

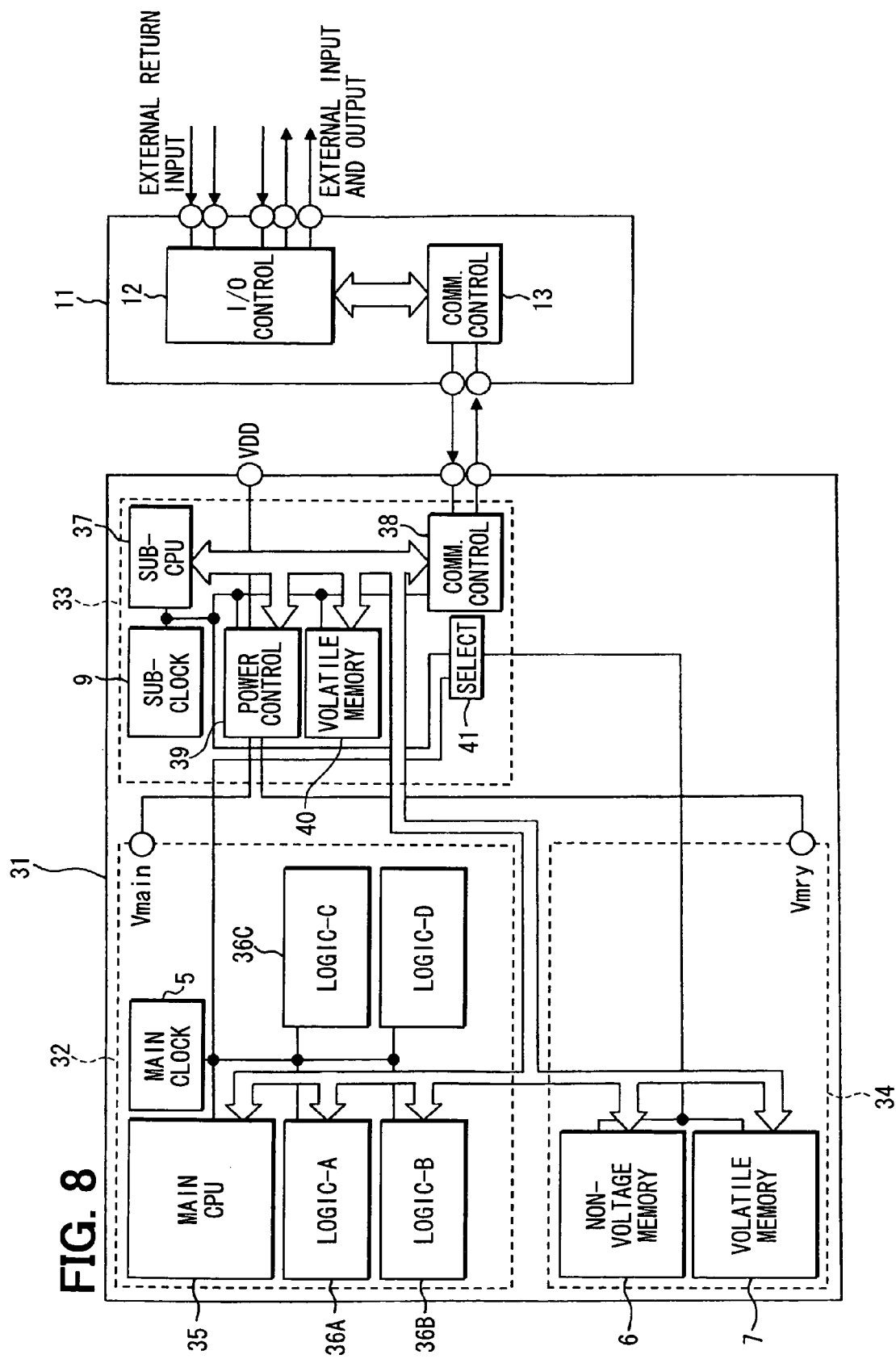

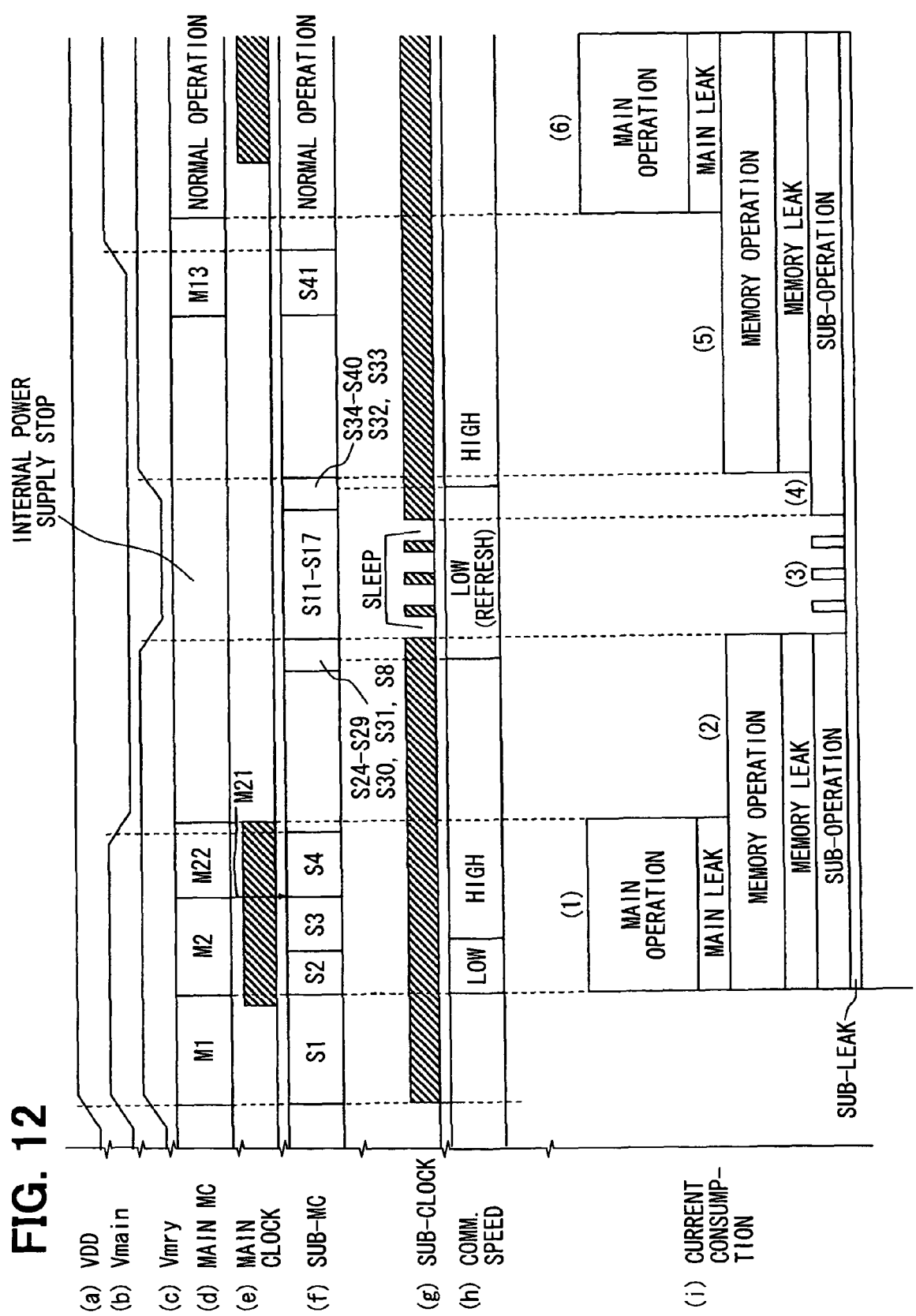

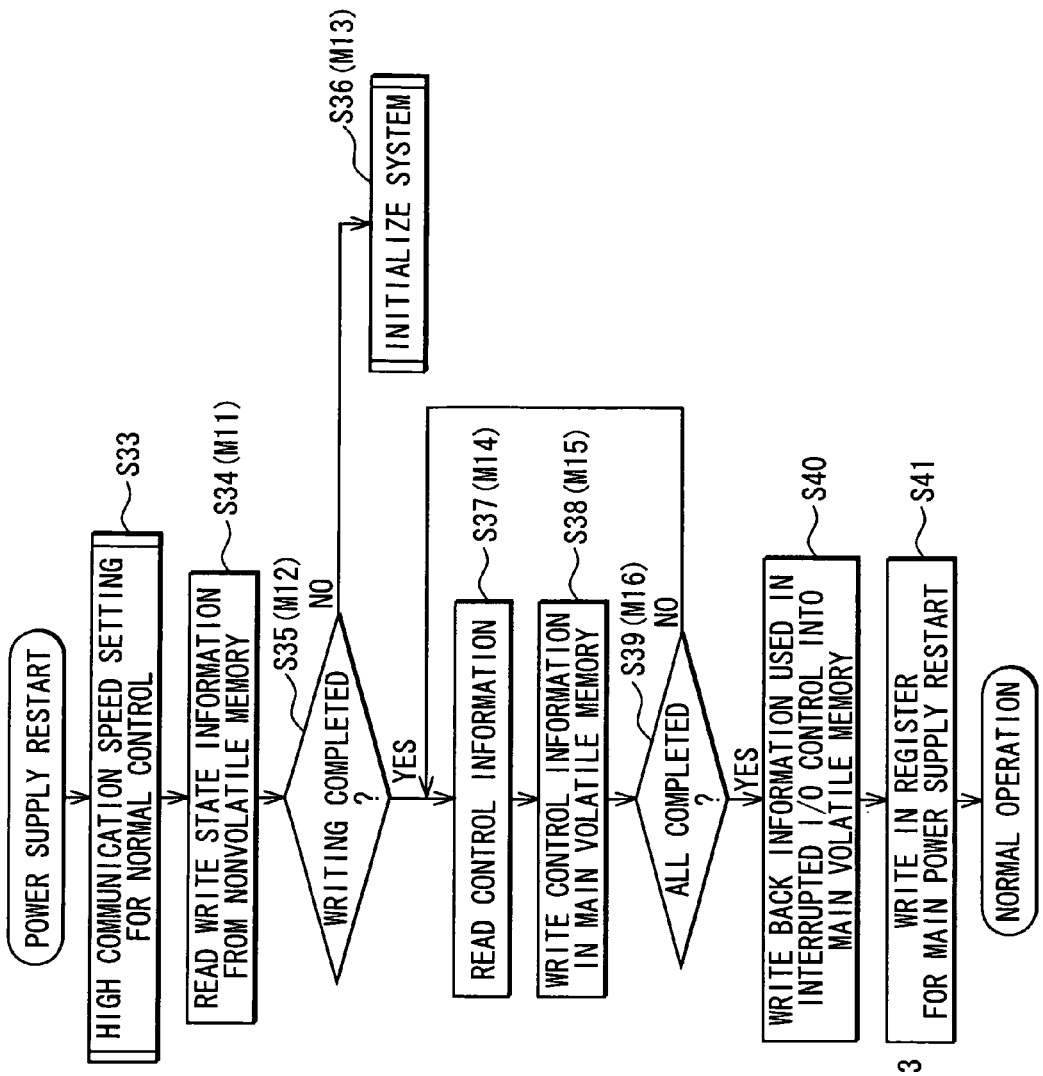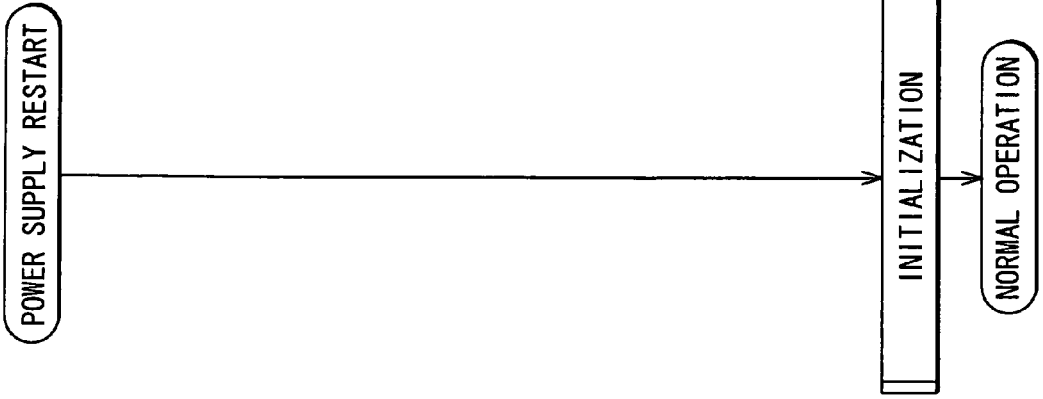

MICROCOMPUTER SYSTEM WITH REDUCED POWER CONSUMPTION

CROSS REFERENCE TO RELATED APPLICATION

This application is based on and incorporates herein by reference whole contents of Japanese Patent Applications No. 2007-272256 filed on Oct. 19, 2007 and No. 2008-145773 filed on Jun. 3, 2008.

FIELD OF THE INVENTION

The present invention relates to a microcomputer system having a configuration section that operates by supply of a sub-clock signal having a frequency lower than that of a main clock signal which is supplied to the a main CPU section to control the operation of the main CPU section.

BACKGROUND OF THE INVENTION

In a conventional microcomputer system, in order to reduce power consumption, a microcomputer is shifted to a sleep mode that stops the supply of operation clock to hold the internal state when the microcomputer becomes a state in which an event to be processed does not occur. For example, U.S. Pat. No. 5,737,588 (JP 8-76873A) discloses that the operation of a main oscillator circuit that supplies a clock signal to a central processing unit (CPU) is controlled by hardware logic that operates in response to a CR oscillation signal that is lower in frequency than the clock signal. That is, when the microcomputer is shifted to the sleep mode, the CR oscillation signals are counted up by a timer, and the main oscillator circuit restarts after a given period of time elapses to wake up the microcomputer.

As a result of increasingly reducing the size of the microcomputer, a leak current is generated more in a circuit to which a power is supplied. For this reason, even if only the supply of the clock signal to the CPU stops, it is difficult to reduce the power consumption because of the leak current (off leak). Under the circumstances, it is proposed to block power supply as much as possible to reduce the power consumption when it is unnecessary to operate the microcomputer.

In order to block the power that is supplied to the microcomputer to reduce the power consumption, there is required a configuration in which the power is supplied to the microcomputer at appropriate timing to restart the microcomputer. However, when the above function is configured by the hardware logic as in U.S. Pat. No. 5,737,588, the power supply turns on to start the microcomputer after a given period of time has elapsed, resulting in that the effect of reducing the power consumption is lowered.

SUMMARY OF THE INVENTION

The present invention has therefore an object to provide a microcomputer system, which appropriately controls the supply of power to a main CPU section so as to reduce the power consumption.

According to the present invention, a microcomputer system comprises a main CPU section, a sub-CPU section a sub-oscillator circuit, a power supply control circuit. The main CPU section includes a main CPU that operates upon receiving a main clock signal. The sub-CPU section includes a sub-CPU and has circuit gates that are smaller in number than in the main CPU section. The sub-oscillator circuit oscillates and outputs a sub-clock signal, which has a frequency lower than that of the main clock signal and is supplied to the sub-CPU section. The power supply control circuit is mounted in the sub-CPU section and controls the power supply to at least a part of the main CPU section. The main CPU is configured to give an operation stop notification to the sub-CPU, when the main CPU determines that an operation stop condition of the main CPU is satisfied. The sub-CPU is configured to stop the power supply to the main CPU section and set the sub-oscillator circuit to the intermittent mode when the sub-CPU recognizes the operation stop notification. The sub-CPU is configured to check whether an operation start condition of the main CPU section is satisfied in a period where the sub-clock signal is supplied. The sub-CPU is configured to change over the sub-oscillator circuit to the continuous mode, and restart the power supply to the main CPU section, when the operation start condition is satisfied.

BRIEF DESCRIPTION OF THE DRAWINGS

The above and other objects, features and advantages of the present invention will become more apparent from the following detailed description made with reference to the accompanying drawings. In the drawings:

FIG. 3 is a timing chart showing a process of restarting a power supply after the power supply to a main microcomputer has stopped in a power supply normal state according to the first embodiment;

FIG. 4 is a timing chart corresponding to FIG. 3 when a supply voltage drop is detected according to the first embodiment;

FIG. 5A is a flowchart showing a process of the main microcomputer side, and FIG. 5B is a flowchart showing a process of the sub-microcomputer side, when the power supply to the main microcomputer stops, respectively, according to the first embodiment;

FIG. 8 is a functional block diagram schematically showing a microcomputer system according to a second embodiment of the present invention;

FIG. 12 is a timing chart showing a process of restarting a power supply after the power supply to a main microcomputer has stopped in a power supply normal state according to the second embodiment;

FIG. 15A is a flowchart showing a process of the main microcomputer side, and FIG. 15B is a flowchart showing a process of the sub-microcomputer side, when the power supply to the sub-microcomputer restarts, respectively, according to the second embodiment.

DETAILED DESCRIPTION OF THE PREFERRED EMBODIMENTS

Figure 1:
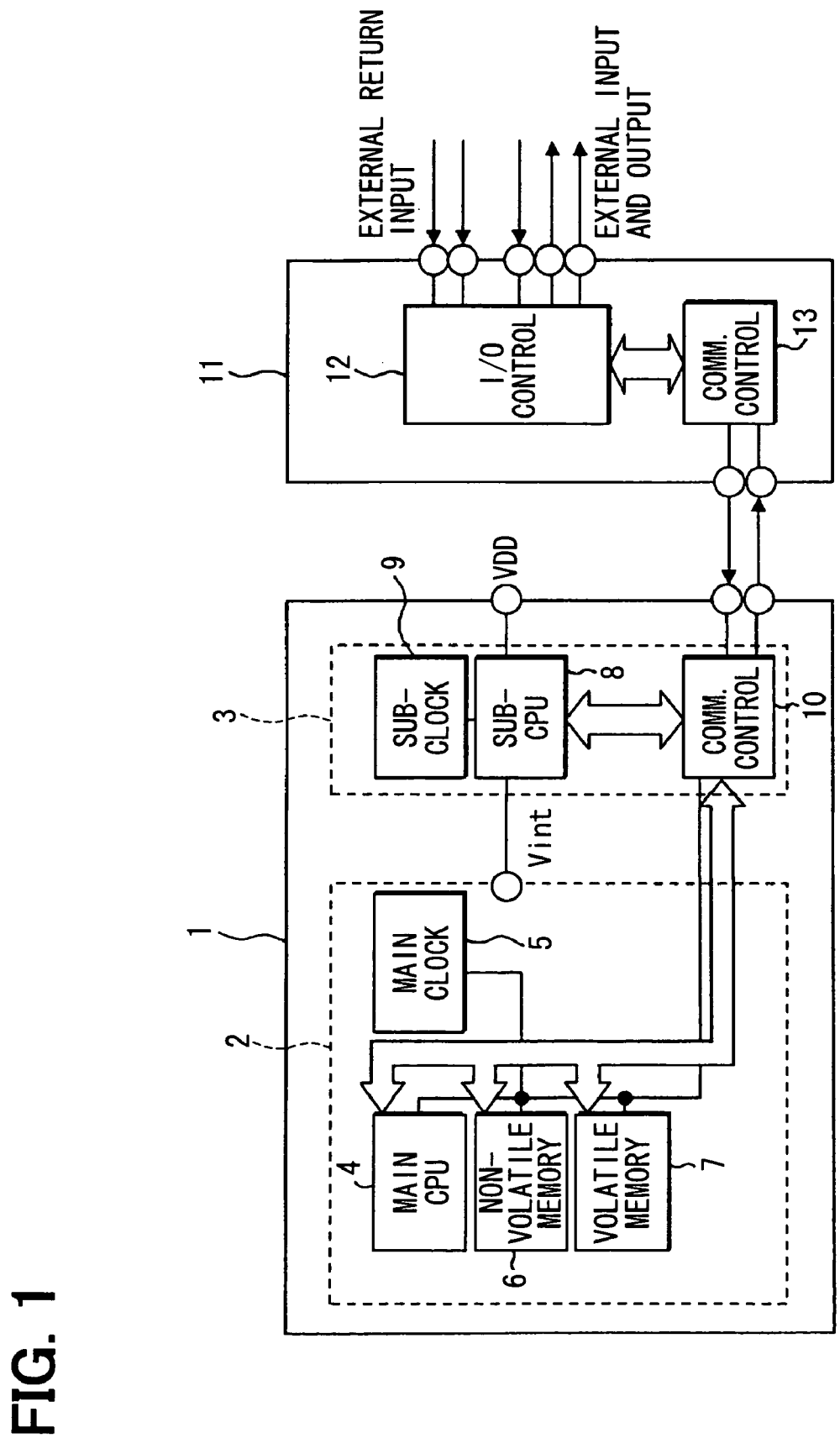
FIG. 1 is a functional block diagram schematically showing a microcomputer system according to a first embodiment of the present invention.

The present invention will be described in further detail with reference to various embodiments shown in the drawings, in which the same or similar parts are designated with the same or similar reference numerals.

First Embodiment

Referring first to FIG. 1, a microcomputer system 1 is applied for the electronic control of, for example, an in-vehicle device (not shown). The microcomputer system 1 includes a main microcomputer (main MC or main CPU section) 2, and a sub-microcomputer (sub-MC or sub-CPU section) 3.

The main microcomputer 2 includes a main CPU 4, a main clock section 5, a (main) nonvolatile memory element 6, and a (main) volatile memory element 7. The main CPU 4 operates in response to a main clock signal having a frequency of, for example, about 100 MHz, which is supplied from the main clock section 5. The main CPU 4 is, for example, a 32-bit CPU, and executes a main portion of the processing in the microcomputer system 1. The main clock section 5 multiplies a reference clock signal that is output from an oscillator circuit having an external oscillator by a multiplier circuit although being not specifically shown, to generate a main clock signal.

The nonvolatile memory element 6 is formed of, for example, a flash memory, and stores the control program of the main CPU 4, and data, therein. The volatile memory element 7 is formed of, for example, an SRAM, a DRAM, a register, or a flip-flop circuit, and is used as a work area when the main CPU 4 executes the control program.

The sub-microcomputer 3 includes a sub-CPU 8, a sub-clock section (sub-oscillator circuit) 9, and a communication control section 10. The sub-CPU 8 operates in response to a sub-clock signal having a frequency of, for example, about several MHz, which is supplied from the sub-clock section 9. The sub-CPU 8 is formed of, for example, an 8-bit or 16-bit CPU, and executes the low power consumption control and the communication control of the microcomputer system 1, and other auxiliary processing. The communication control section 10 is connected to the main microcomputer 2 through a bus.

An I/O section 11 includes an I/O control section 12 and a communication control section 13. The I/O control section 12 controls the input and output of signals related to, for example, an operation switch with respect to the external. The I/O control section 12 also communicates (for example, a full duplex serial communication) those signals with respect to the communication control section 10 on the microcomputer system 1 side through the communication control section 13.

Figure 2:
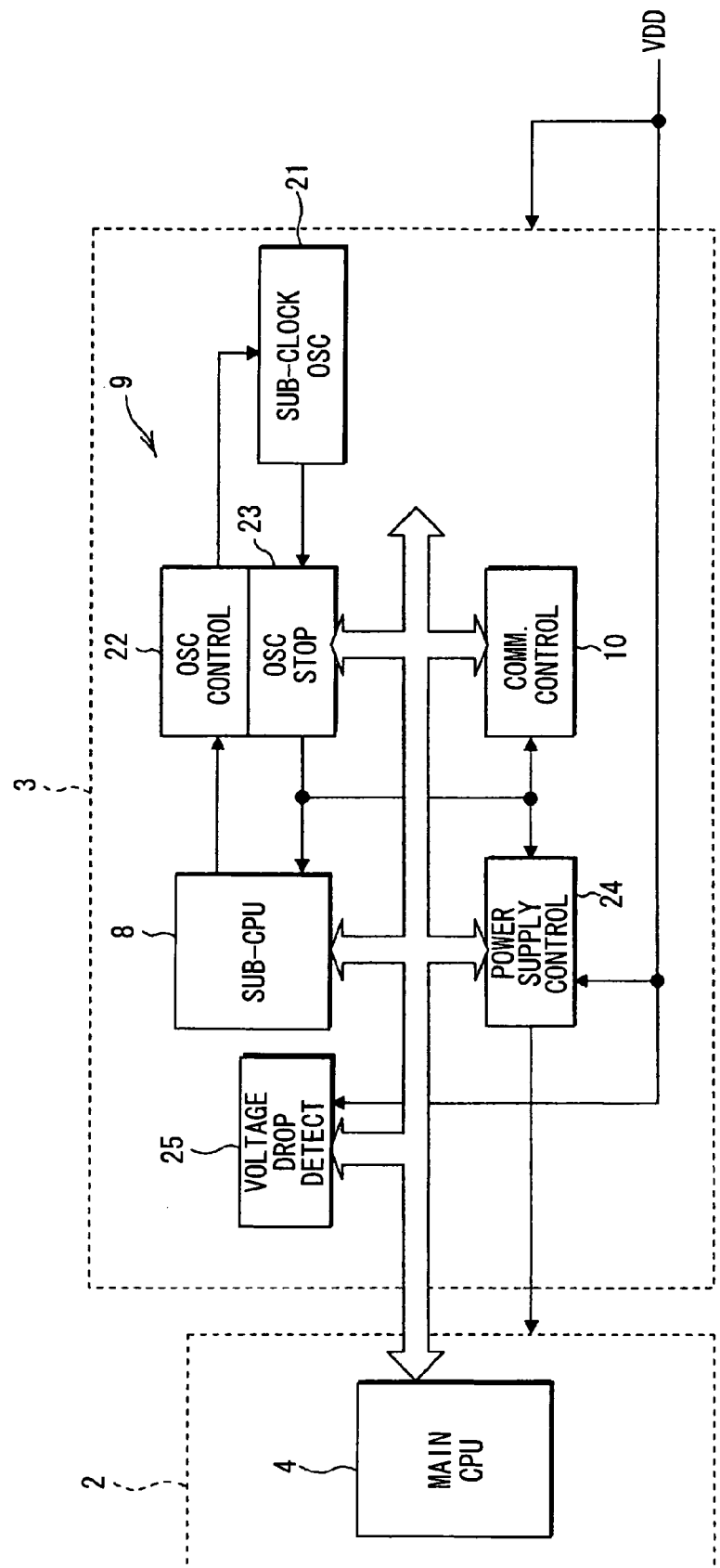
FIG. 2 is a block diagram showing a sub-microcomputer according to the first embodiment.

The more detailed configuration of the sub-microcomputer 3 is shown in FIG. 2. The sub-clock section 9 includes a sub-clock oscillator circuit 21, an oscillation control circuit 22, and an oscillation stop circuit 23. The sub-clock oscillator circuit 21 is formed of, for example, a CR oscillator circuit or a ring oscillator that is configured by connecting plural logical NOT circuits in a ring shape. The sub-CPU 8 is capable of conducting the control for intermittently stopping the oscillating operation of the sub-clock oscillator circuit 21 through the oscillation control circuit 22. For example, when the sub-CPU 8 sets and instructs the stop of the oscillating operation, the oscillation control circuit 22 stops the oscillating operation of the sub-clock oscillator circuit 21. However, after a given period of time has elapsed, the oscillation control circuit 22 automatically restarts the oscillating operation. Also, the oscillation stop circuit 23 is formed of a gate logic that shuts down the sub-clock signal that is output by the oscillator circuit 21. The sub-clock signal is supplied to the communication control section 10 and a power supply control section 24 together with the sub-CPU 8 through the oscillation stop circuit 23.

A power supply VDD is backed up by backup means such as a backup capacitor (not shown), and supplied to the sub-microcomputer 3. The power supply control section (power supply control circuit) 24 is controlled by the sub-CPU 8, and supplies or shuts down the power supply VDD with respect to the main microcomputer 2 side (corresponding to "internal power supply Vint" in FIG. 1). A voltage drop detection section 25 includes a comparator for detecting whether the voltage of the power supply VDD is lower than a given level or not, or an A/D converter circuit. The main CPU 4, the sub-CPU 8, the communication control section 10, the oscillation stop circuit 23, and the power supply control section 24 are connected to each other through a bus.

The main microcomputer 2 actually has plural peripheral circuits mounted thereon although not shown in the figure. Accordingly, the sub-microcomputer 3 is formed by circuit gates of the number which is smaller than the number of circuit gates that form the main microcomputer 2.

The operation of this embodiment will be described with reference to FIGS. 3 to 7A, 7B.

<Process of Shifting to Intermittent Operation Mode>

Referring to FIG. 5A, upon cancelling the reset, the main CPU 4 executes the normal operation according to the control program (step M2) after having initialized the volatile memory element 7 (step M1). During the execution of the normal operation, the main CPU 4 checks whether the voltage drop detection section 25 has detected the voltage drop of the power supply VDD or not (step M3), and also checks whether the shift to the intermittent operation as the microcomputer system 1 is enabled or not (step M4). In this example, the "intermittent operation" of the microcomputer system 1 is directed to a state in which the power supply to the main microcomputer 2 stops, and only the sub-microcomputer 3 side intermittently operates in response to the sub-clock signal.

In step M4, the condition of whether the shift to the intermittent operation is enabled or not is, for example, whether a communication between the ECU through the I/O section 11, or the input operation of the external switch occurs, or not. In a loop of steps M2 to M4, when "yes" is determined in any one of steps M3 and M4, the main CPU 4 writes data indicative of "under writing" at an address where the write state information of the nonvolatile memory element 6 is stored (step M5). When "yes" is determined in step M3, the main CPU 4 sets "power drop flag" in a flag storage region that is set in a region that can be accessed by the sub-CPU 8 (step M3a), and thereafter shifts to step M5.

When the main CPU 4 reads the control information at that time point from, for example, an internal register (step M6), the main CPU 4 writes and stores the read control information in a given region of the nonvolatile memory element 6 (step M7). Then, the main CPU 4 repeats the processing of steps M6 and M7 until all of the control information (all the regions) has been completely stored (no in step M8). Upon completion of the storage (yes in step M8), the main CPU 4 writes data indicative of "writing completed" at the storage address of the write state information of the nonvolatile memory element 6 (step M9). Then, when the main CPU 4 notifies the sub-microcomputer 3 that the control information has been completely stored (step M10), the main CPU 4 waits until the power supply shut-down.

The notification in step M10 is conducted in such a manner that, for example, the memory and the register which can be accessed by both of the main CPU 4 and the sub-CPU 8 are connected to a common bus, and the sub-CPU 8 detects that the main CPU 4 has written data in the specific regions of the memory and the register by polling. Also, the main CPU 4 can conduct interruption directly with respect to the sub-CPU 8.

Referring to FIG. 5B, the sub-CPU 8 is initialized upon cancelling the reset as with the main CPU 4 (step S1). Subsequently, the sub-CPU 8 sets the communication speed of the communication control section 10 to a higher speed side (for example, about several tens Mbps) (step S2). Then, the sub-CPU 8 executes the normal operation according to the control program (step S3). During the execution of the normal operation, the sub-CPU 8 checks whether the voltage drop of the power supply VDD is detected, and the notification in step M10 is conducted or not (step S4), and whether the conditions in which the shift to the intermittent operation on the main CPU 4 are satisfied, and the notification in step M10 is conducted or not (step S5).

When the sub-CPU 8 receives the above notification from the main CPU 4 in correspondence with any factor of steps S4 and S5 (yes), the sub-CPU 8 sets the communication speed of the communication control section 10 to a lower speed side (for example, about 1 Mbps) (step S6). Then, when the sub-CPU 8 writes data for stopping the power supply to the main microcomputer 2 side in the register within the power supply control section 24 (step S7), the sub-CPU 8 sets the oscillation control circuit 22 so as to stop the oscillating operation of the sub-clock oscillator circuit 21, that is, the sub-microcomputer 3 becomes in a sleep state while the operation intermittently stops (step S8), and shifts to the intermittent operation mode of the microcomputer system 1.

FIG. 3 shows a process of restarting the power supply after the power supply to the main microcomputer 2 has stopped in a normal operating state (in a power supply normal state). The main microcomputer state of (d) and the sub-microcomputer state of (h) show the execution timing of the respective steps M1 to M10 and S1 to S8 in the flowcharts of FIGS. 5A and 5B. Upon the completion of the processing of FIGS. 5A and 5B, the main microcomputer 2 stops the operation upon shutting down the power supply, and the sub-microcomputer 3 operates upon receiving the intermittent supply of the sub-clock signal ((g) in FIG. 3).

<Process of Sub-Microcomputer 3 in Intermittent Operation Mode>

Figure 6:
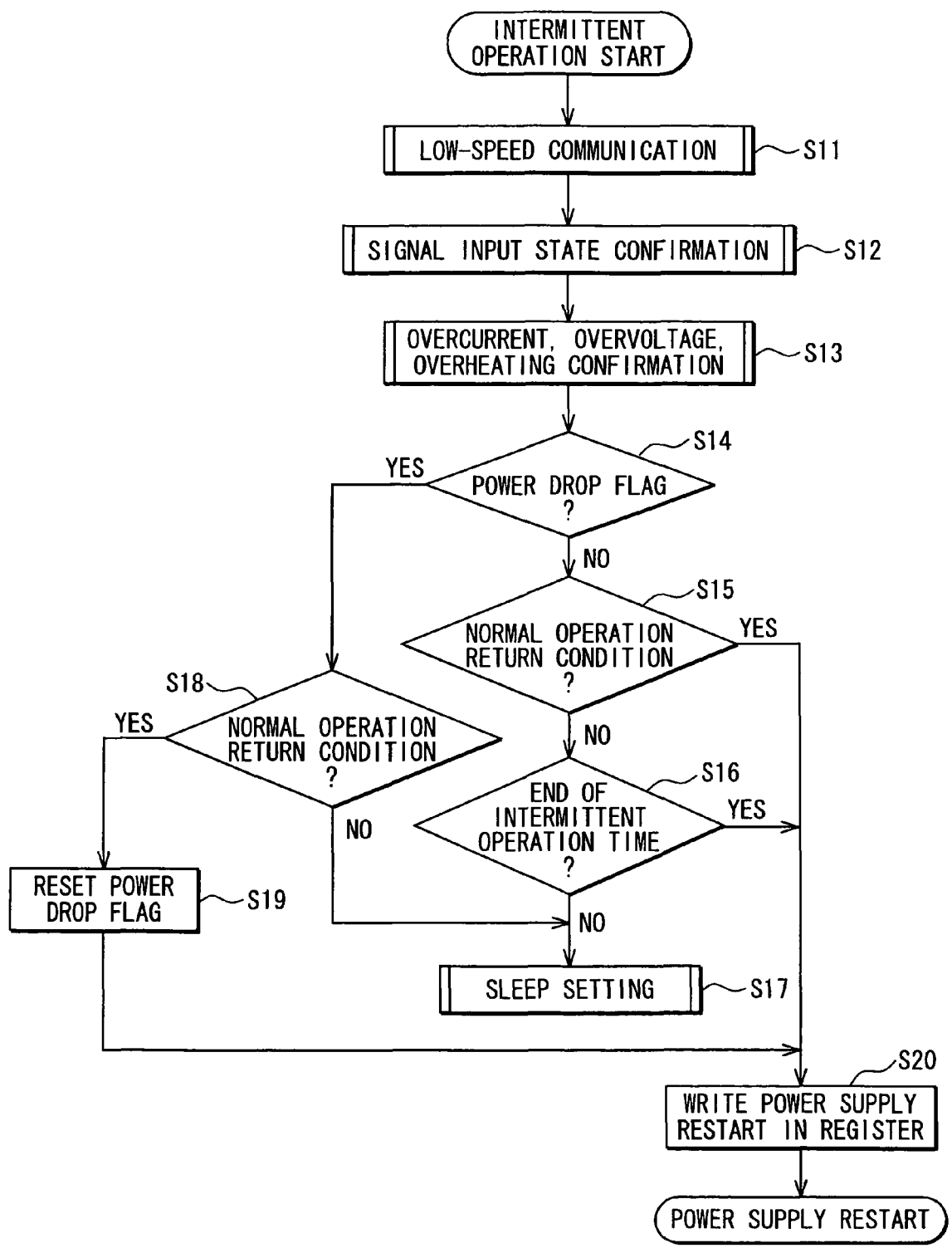
FIG. 6 is a flowchart showing a process when the sub-microcomputer intermittently operates according to the first embodiment.

FIG. 6 is a flowchart showing a process when the sub-clock signal is intermittently supplied to the sub-microcomputer 3 to operate the sub-microcomputer 3. The sub-CPU 8 conducts a low-speed communication with the I/O control section 12 through the communication control sections 10 and 13 (step S11), and confirms a signal input state (related to the return factor of the main microcomputer 2 side) from the external side with respect to the I/O control section 12 (step S12).

Upon confirming the detection state such as overcurrent, overvoltage or overheating which is detected by a detector circuit (step S13), the sub-CPU 8 checks whether "power drop flag" has been set in the flag storage region or not (step S14). When the flag has not been set (no), the sub-CPU 8 conducts the determination of the subsequent steps S15 and S16. When the above flag has been set (yes), the sub-CPU 8 checks whether the voltage drop of the power supply VDD is removed (undetected) or not, as the conditions for returning the main microcomputer 2 side to the normal operation (step S18).

The normal operation return condition that is determined in step S15 is that an event such as the ECU communication or the external switch occurs or the current abnormality or the abnormality of the supply voltage in step S13 is detected.

In subsequent step S16, the sub-CPU 8 checks whether the setting time of the intermittent operation which has been determined according to the specification in advance has been terminated or not, as another normal operation return condition. The time measurement in this example can be conducted, for example, by counting the number of starts while the sub-CPU 8 is conducting the intermittent operation (how many times the processing of FIG. 6 is executed).

When "no" is determined in all of steps S14 to S16, and when "no" is determined in step S18, the sub-CPU 8 again sets the oscillation control circuit 22 so as to stop the oscillating operation of the sub-clock oscillator circuit 21 (step S17), and then shifts to the sleep state. On the other hand, when "yes" is determined in any one of steps S15, S16 and S18, the sub-CPU 8 writes data for restarting the power supply for the main microcomputer 2 side in the register within the power supply control section 24 (step S20), and then shifts from the power supply return operation to the normal operation mode. When "yes" is determined in step S18, the sub-CPU 8 resets "power supply drop flag" (step S19), and then shifts to step S20.

<Process of Shifting to Normal Operation Mode>

Figure 7B:
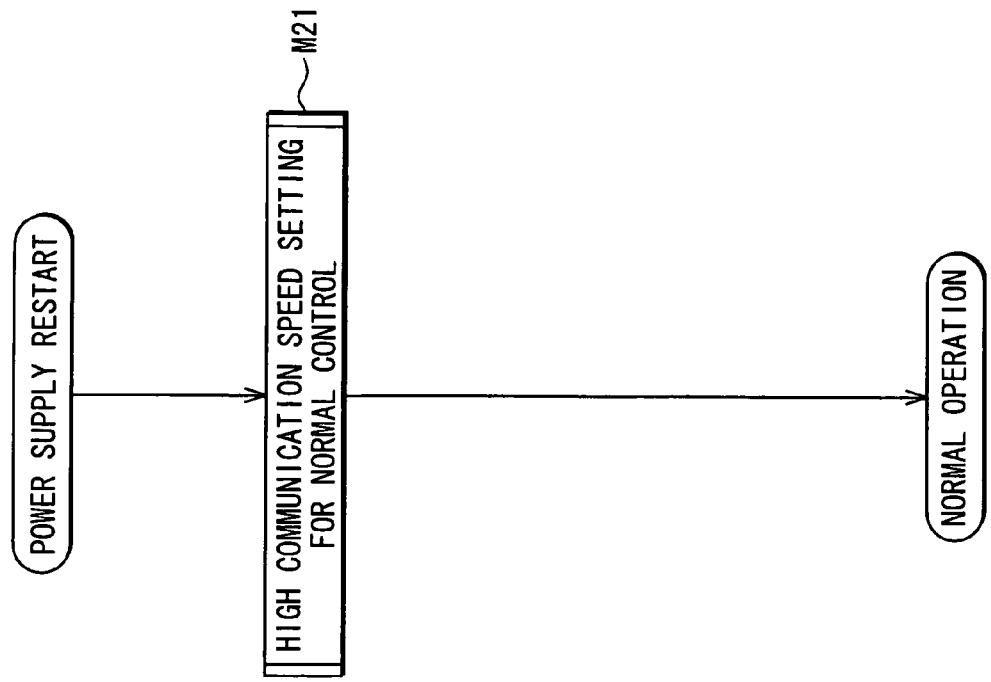
FIG. 7B is a flowchart showing a process of the sub-microcomputer side, when the power supply to the main microcomputer restarts, respectively, according to the first embodiment.
Figure 7A:
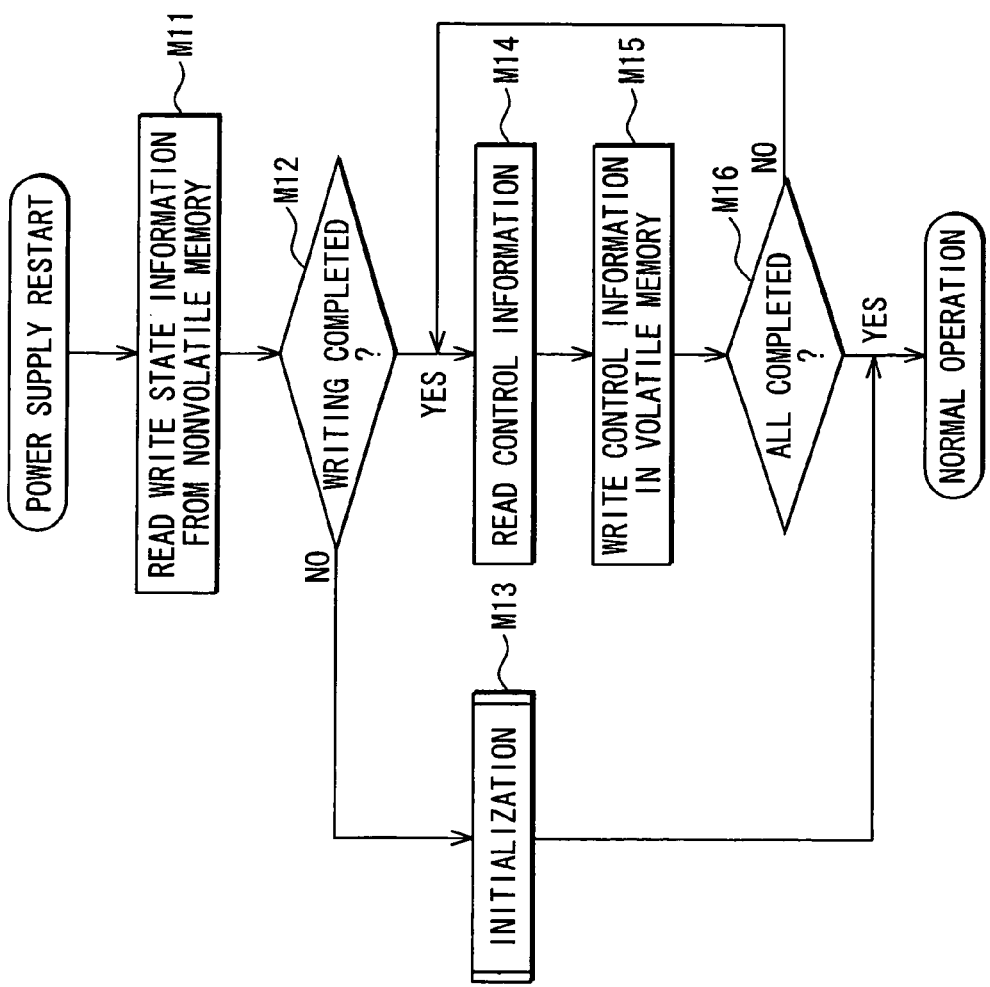
FIG. 7A is a flowchart showing a process of the main microcomputer side.

FIG. 7A is a flowchart showing a process of the main microcomputer 2 side, and FIG. 7B is a flowchart showing a process of the sub-microcomputer 3 side, when the power supply to the main microcomputer 2 side restarts from the intermittent operation, and the mode shifts to the normal operation mode. Referring to FIG. 7A, upon reading data from the storage address of the write state information of the nonvolatile memory element 6 (step M11), the main CPU 4 checks whether the data is indicative of "writing completed" or not (step M12). When the data is indicative of "writing completed" (yes), the main CPU 4 reads the control information that has been stored in the nonvolatile memory element 6 in step M7 (step M14), and rewrites the control information in the volatile memory element 7 (step M15). Then, when the main CPU 4 rewrites the control information in all of the regions (yes in step M16), the main CPU 4 shifts to the normal operation.

On the other hand, if the data that has been read from the storage address of the write state information is indicative of "under writing" (no) in step M12, it means that the writing of the control information has not been fully completed when shifting to the intermittent operation mode. When an attempt is made to continue the processing on the basis of the control information, the possibility that the malfunction occurs is extremely high. Therefore, in this case, the main CPU 4 executes the same initialization as that of step M1 (step M13).

When the power supply turns on to start the main CPU 4, the main CPU 4 conducts the processing branch of whether to first execute the initialization of the step M1, or to execute step M11, for example, according to the results of referring to the flag for checking whether step M1 has been executed once or not.

The process on the sub-microcomputer 3 side shown in FIG. 7B is only a process of setting the communication speed of the communication control section 10 to the higher speed side as in step S2 in this case (step S21), and thereafter the main CPU 4 executes the normal operation.

The above processing in FIG. 7A (M11 to M16) and FIG. 7B (S21) are also indicated in FIGS. 3 and 4.

The timing charts of FIG. 3 and FIG. 4 are substantially the same in the processing contents with each other, but different from each other in that the voltage of the power supply VDD shown at (a) in FIG. 4 changes. That is, on the main microcomputer 2 side, as shown at (d) in FIG. 4, a time point at which the voltage drop of the supply voltage VDD is detected during the normal operation is a time point at which "yes" is determined in step M3. Also, on the sub-microcomputer 3 side, as shown at (h) in FIG. 4, a time point at which the voltage drop of the power supply VDD is not detected during the intermittent operation is a time point at which "yes" is determined in step S18.

As described above, the microcomputer system 1 according to this embodiment is equipped with the sub-CPU 8 and the power supply control section 24 that controls the power supply to the main microcomputer 2 apart from the main microcomputer 2 including the main CPU 4. Also, the sub-clock section 9 that supplies the sub-clock signal having the lower frequency to the sub-microcomputer 3 is configured to be switchable between the continuous mode and the intermittent mode.

When the main CPU 4 determines that its own operation stop conditions are satisfied and gives the operation stop notification to the sub-CPU 8, the sub-CPU 8 recognizes the notification, stops the power supply to the main microcomputer 2, and sets the sub-clock section 9 to the intermittent mode. Further the sub-8 checks whether the operation start condition of the main microcomputer 2 has been satisfied in a period during which the sub-clock signal is supplied in the intermittent mode or not. The sub-CPU 8 switches over the sub-clock section 9 to the continuous mode when the condition is satisfied, and restarts the power supply to the main microcomputer 2.

That is, the sub-CPU 8 intermittently operates in the period during which the power supply to the main microcomputer 2 stops. When the sub-CPU 8 determines that the operation start condition of the main microcomputer 2 has been satisfied during the operation period, the sub-CPU 8 supplies the power to the main microcomputer 2. As a result, the sub-CPU 8 is capable of surely checking whether the start of the main microcomputer 2 is necessary or not. The sub-CPU 8 intermittently operates, thereby making it possible to reduce the power consumption as a whole.

When the main CPU 4 determines that its own operation stop condition has been satisfied, the main CPU 4 writes and stores the control information that has been stored at that time in the nonvolatile memory element 6. Then, the main CPU 4 gives the operation stop notification to the sub-CPU 8. When the main CPU 5 starts upon restart of the power supply, the main CPU 5 rewrites the control information that has been stored in the nonvolatile memory element 6 in the volatile memory element 7, and executes the processing based on the control information. Accordingly, even if the power supply to the main microcomputer 2 stops, the control information is stored in the nonvolatile memory element 6. As a result, when the power supply restarts, the main CPU 4 is capable of continuing the processing on the basis of the stored control information.

When the main CPU 4 writes all of the control information in the nonvolatile memory element 6, the main CPU 4 writes "writing completed information" in the nonvolatile memory element 6 together, and the power supply restarts to start the main CPU 4. In this case, the main CPU 4 executes initialization without reading the control information when "writing completed information" has not been stored in the nonvolatile memory element 6. Accordingly, when the control information that has been stored in the nonvolatile memory element 6 is incomplete, the malfunction can be prevented on the basis of the control information.

Further, the main CPU 4 determines that the operation stop condition has been satisfied when the voltage drop of the power supply VDD has been detected. Therefore, when the probability that, for example, the instantaneous power failure occurs to make the continuation of the processing difficult is high, the main CPU 4 stops the operation of the main microcomputer 2 to reduce the power consumption so as to contribute to the backup of the power supply.

In addition, the sub-microcomputer 3 is equipped with the communication control section 10 for communicating with the I/O control section 12 that conducts the input and output with respect to the external. The sub-CPU 8 sets the communication speed of the communication control section 10 to the lower speed when the power supply to the main microcomputer 2 stops, and sets the communication speed to the higher speed while the power supply is conducted on the main microcomputer 2. Since only the sub-CPU operates in response to the sub-clock signal having the lower frequency during the period when the main microcomputer 2 does not operate, the power consumption can be reduced without lowering the processing efficiency even if the communication speed is decreased.

The sub-CPU 8 checks whether the operation start condition of the main microcomputer 2 has been satisfied or not, on the basis of the control information that has been acquired through the communication control section 10 in the period where the power supply to the main microcomputer 2 stops. As a result, the operation of the main microcomputer 2 can restart through a communication with the external side (for example, another microcomputer).

Second Embodiment

Referring to FIG. 8, a microcomputer system 31 according to a second embodiment includes a main microcomputer (main MC or main CPU section) 32, a sub-microcomputer (sub-MC or sub-CPU section) 33, and a memory element section 34. The memory element section 34 is formed of a chip that makes the memory elements 6 and 7 separately from the main microcomputer 3. Those memory elements 6 and 7 are mounted on the main microcomputer 3 in the first embodiment. The memory element section 34 can be accessed from both of the main microcomputer 32 side and the sub-microcomputer 33 side.

The main microcomputer 32 includes a main CPU 35 and logic circuits 36 (36A to 36D, for example, gate array) which are peripheral circuits. Those logic circuits 36 also operate upon receiving the main clock signal.

The sub-microcomputer 33 includes a sub-CPU 37, a communication control section 38 and a power supply control section (power supply control circuit) 39. The sub-microcomputer 33 also includes a (sub) volatile memory element 40 and a selector 41. The power supply control section 39 conducts not only the power supply control for the main microcomputer 32 but also the power supply control for the memory element section 34.

The volatile memory element 40 is formed of an SRAM, a DRAM, a register, or a flip-flop circuit as with the volatile memory element 7 on the main microcomputer side, and is used as a work area when the sub-CPU 37 executes the control program. However, the data storage capacity of the volatile memory element 40 is set to be smaller than that of the volatile memory element 7. The selector 41 changes over the main clock signal and the sub-clock signal, and supplies the selected clock signal to the memory element section 34. The changeover control is conducted by the sub-CPU 37. Even when the sub-microcomputer 33 operates in the intermittent operation mode, the power supply is always supplied to the volatile memory element 40, and the memory contents are held without being volatilized.

Figure 9:
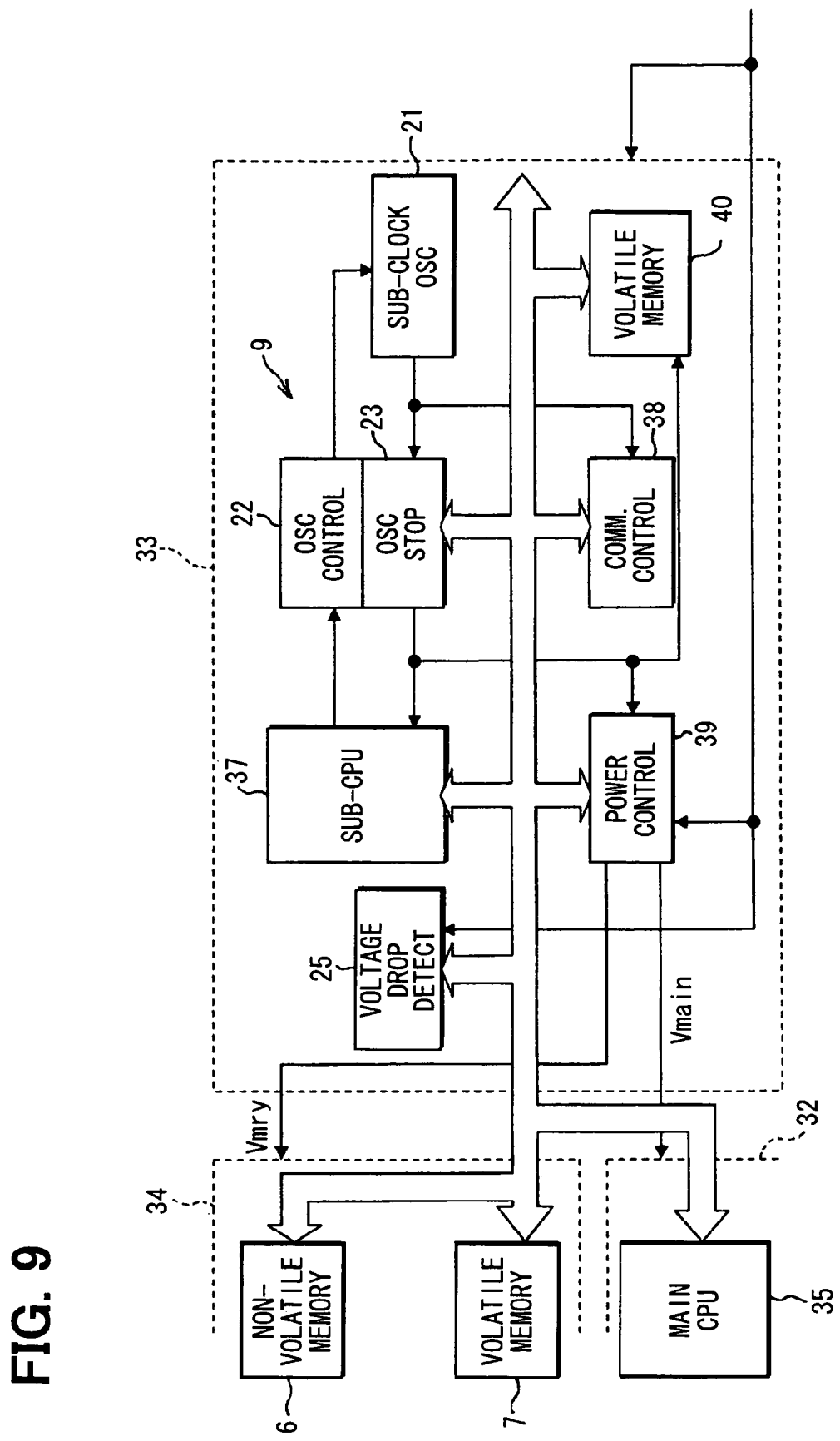
FIG. 9 is a block diagram showing a sub-microcomputer according to the second embodiment.

The sub-microcomputer 33 is shown in detail in FIG. 9. The power supply control section 39 is controlled by the sub-CPU 37 and supplies or shuts down the power supply with respect to the main microcomputer 32 side as the main power supply Vmain. The power supply control section 39 also supplies or shuts down the power supply with respect to the memory element section 34 as the memory element power supply Vmry. The main power supply and the memory element power supply are controlled independently from each other. The sub-clock signal is supplied to the power supply control section 39 and the volatile memory element 40 through the oscillation stop circuit 23. The sub-clock signal is supplied directly to the communication control section 38 from the sub-clock oscillator circuit 21.

The main CPU 35, the sub-CPU 37, the communication control section 38, the oscillation stop circuit 23, the power supply control section 39, and the respective memory elements 6, 7, 40 are connected to each other through a bus. In FIG. 9, the selector 41 is not shown.

Figure 10:
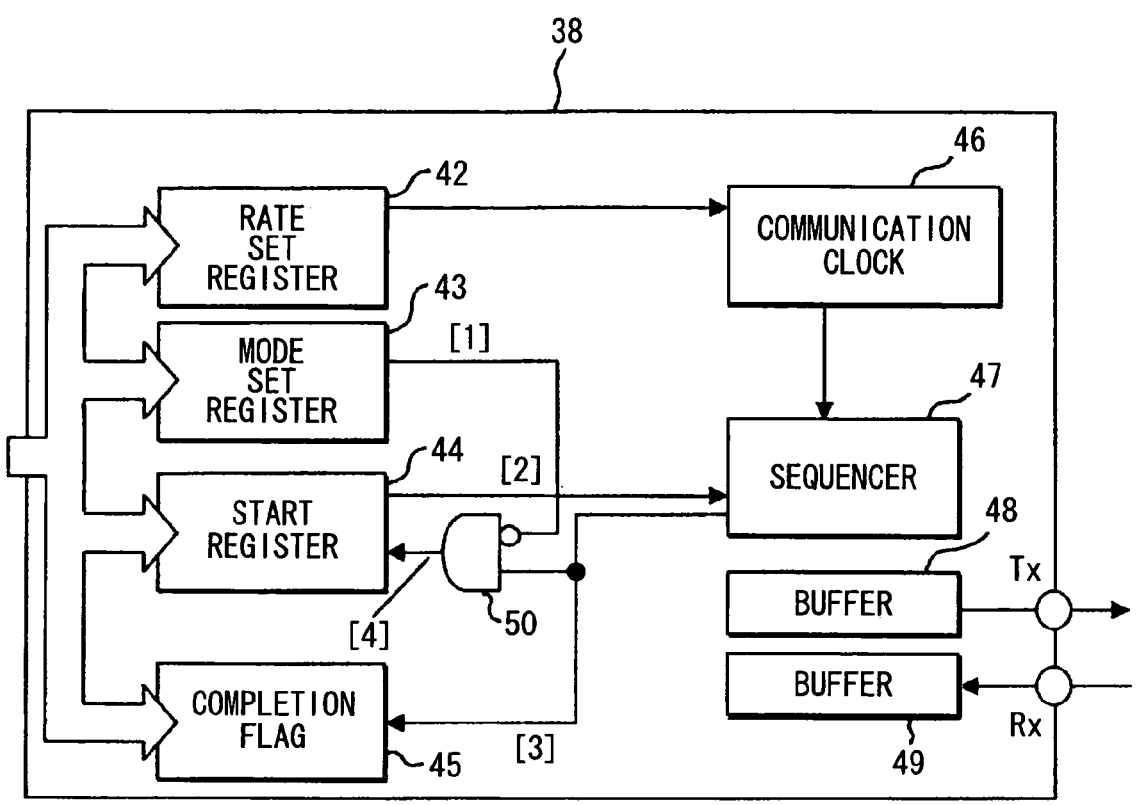
FIG. 10 is a functional block diagram showing a communication control section according to the second embodiment.

The communication control section 38 is configured as shown in FIG. 10. The communication control section 38 includes various registers (communication rate set register 42, communication mode set register 43, communication start register 44) and the storage region of a communication completion flag 45. A communication clock generation section 46 generates the communication clock signal that is synchronous with the sub-clock signal according to the value that is set by the communication rate set register 42, and supplies the communication clock signal to a transmitting and receiving sequencer 47.

Transmission data is set up in a transmitting buffer 48 by means of the sub-CPU 37, and data that has been received from the I/O section 11 side is set up in a receiving buffer 49. Upon receiving a communication start signal (44) from the communication start register 44, the transmitting and receiving sequencer 47 conducts a communication process for transmitting and receiving data through the buffers 48 and 49 in synchronism with the communication clock signal, and sets the communication completion flag 45 upon completion of the communication process.

One of input terminals of an AND gate 50 receives a communication completion flag set signal [3] from the communication sequencer 47, and another input terminal (negative-true logic) receives a mode set data [1] from the communication mode set register 43. An output signal of the AND gate 50 is output to the communication start register 44 as a clear signal [4].

Figure 11A:
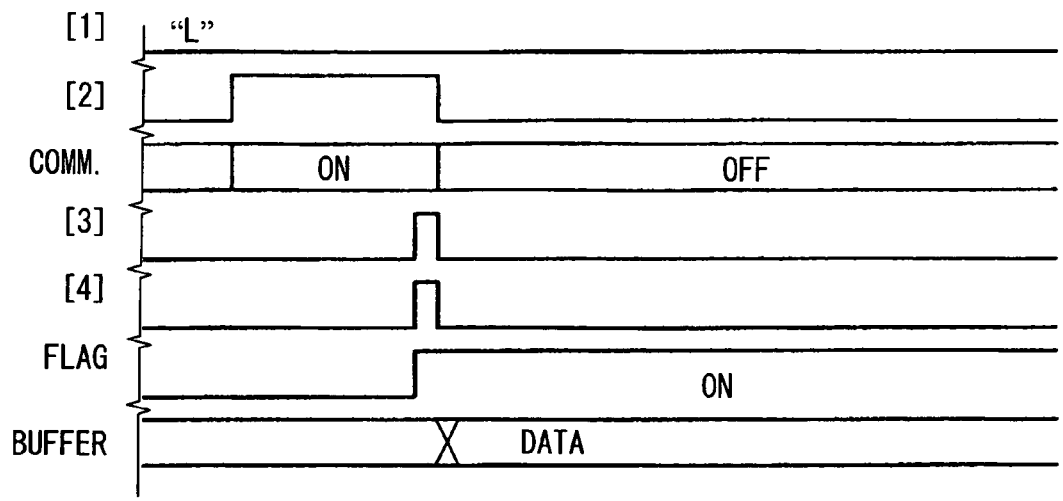
FIG. 11A is a timing chart showing the operation of the communication control section in a normal operation mode.
Figure 11B:
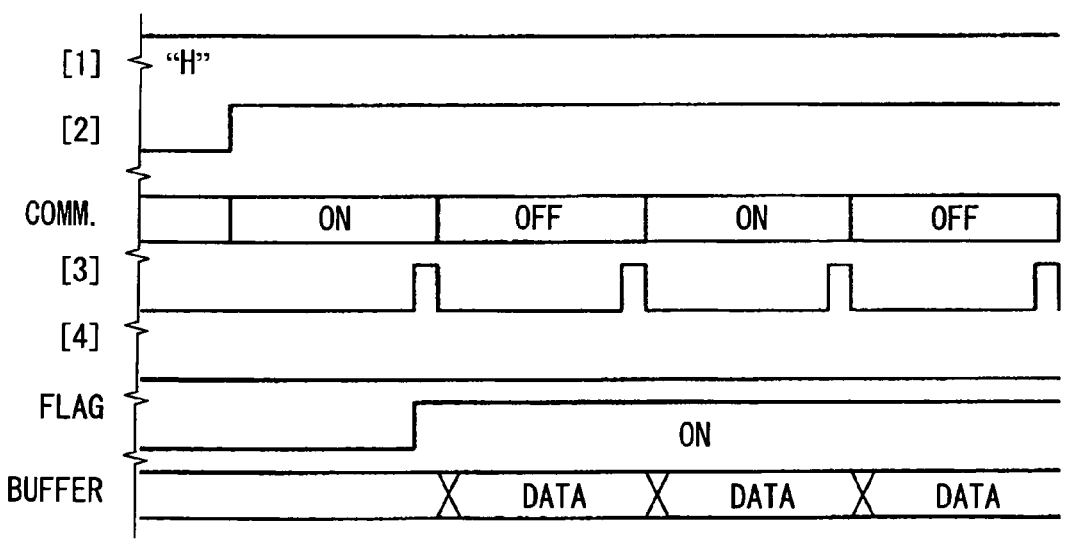
FIG. 11B is a timing chart showing the operation of the communication control section in an automatic refresh mode, according to the second embodiment, respectively.

FIG. 11A is a timing chart showing the operation of the communication control section 38 in a normal operation mode, and FIG. 11B is a timing chart showing the operation of the communication control section in an automatic refresh mode. Numerals [1] to [4] indicated in the figures correspond to the signals of the respective portions shown in FIG. 10. When the sub-CPU 37 sets data "0 or L (low level)" in the communication mode set register 43, the mode is set to the normal operation mode. When the sub-CPU 37 sets data "1 or H (high level)" in the communication mode set register 43, the mode is set to the automatic refresh mode.

In the case of the normal operation mode shown in FIG. 11A, when the sub-CPU 37 writes the data "1" indicative of the communication start in the communication start register 44, the transmitting and receiving sequencer 47 starts to start the communication process, and the data receiving process is conducted "under communication (COMM. ON)". Then, when the communication has been completed, the transmitting and receiving sequencer 47 sets up the communication completion flag 45 (ON), and the communication start register 44 is cleared by the output of the set signal at that time. At the same time, the data of the receiving buffer 49 is updated.

On the other hand, in the case of the automatic refresh mode shown in FIG. 11B, when the sub-CPU 37 writes the instruction data of the communication start in the communication start register 44, the communication process starts in the same manner as described above. Then, upon completion of the communication, the transmitting and receiving sequencer 47 sets up the communication completion flag 45. However, the communication start register 44 is not cleared by shutting down the communication completion flag 45 due to the AND gate 50. Accordingly, since the communication sequencer 47 immediately starts a subsequent communication process, the data of the receiving buffer 49 is periodically updated (automatically refreshed).

Subsequently, the operation of the second embodiment will be described with reference to FIGS. 12 to 15A, 15B, which correspond to FIGS. 3, 5A, 5B to 7A, 7B in the first embodiment.

<Process of Shifting to Intermittent Operation Mode>

Figure 13A:
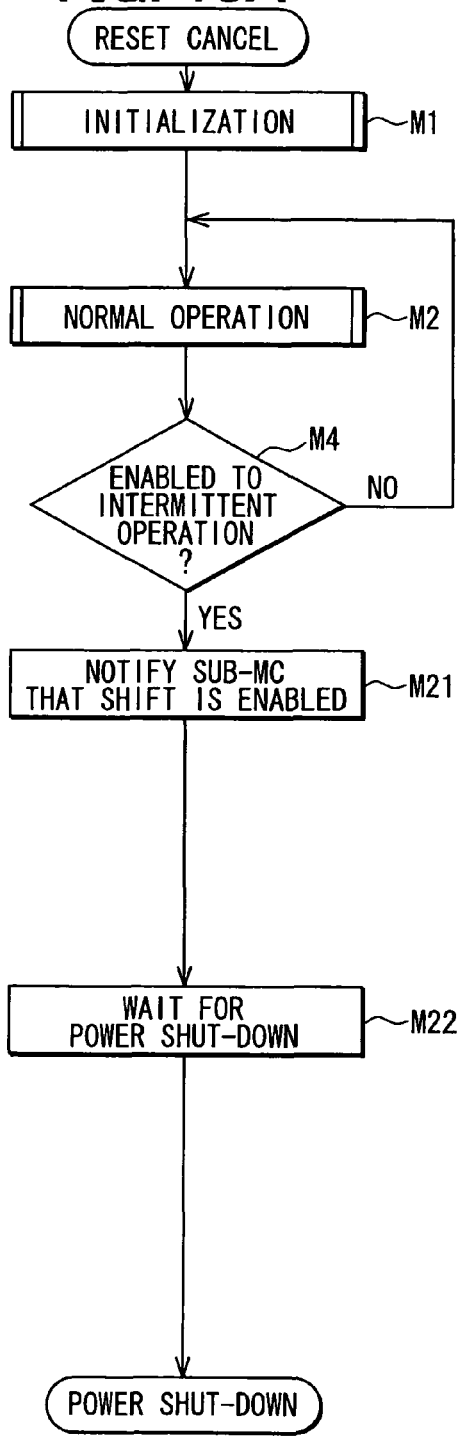
FIG. 13A is a flowchart showing a process of the main microcomputer side.

Referring to FIG. 13A, upon canceling the reset, the main CPU 35 executes step M4 subsequent to steps M1 and M2. When "yes" is determined, the main CPU 35 notifies the sub-microcomputer 33 side that shift to the intermittent operation is enabled (step M21), and waits for a power supply shut-down (step M22).

Figure 13B:
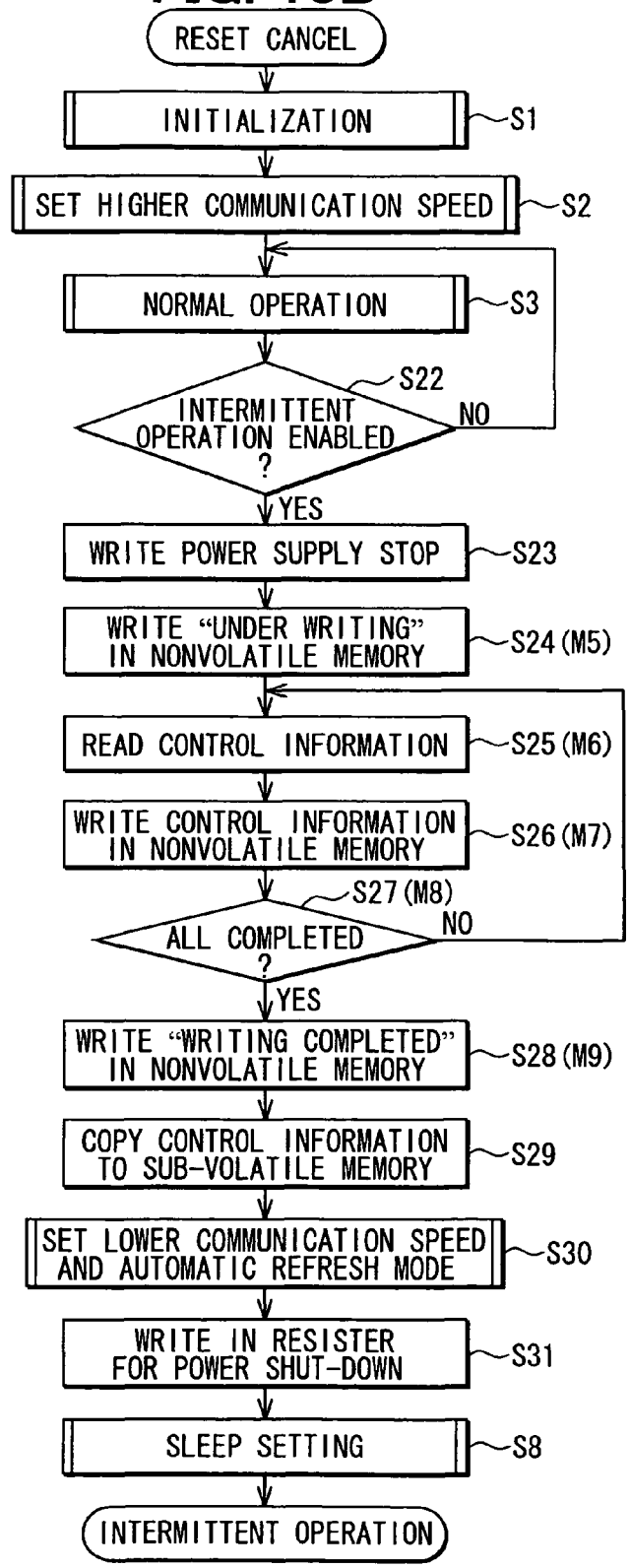
FIG. 13B is a flowchart showing a process of the sub-microcomputer side, when the power supply to the sub-microcomputer stops, respectively, according to the second embodiment.

Referring to FIG. 13B, upon canceling the reset, the sub-CPU 37 executes steps S1 to S3, the sub-CPU 37 waits for the notification of step M21 from the main CPU 35, and checks whether the intermittent operation is enabled or not (step S22). When the sub-CPU 37 receives the above notification from the main CPU 35 (yes), the sub-CPU 37 writes data for stopping the power supply to the main microcomputer 32 side in the register within the power supply control section 39 (step S23). Then, the sub-CPU 37 executes a process corresponding to steps M5 to M9 which has been conducted by the main CPU 4 in the first embodiment (steps S24 to S28). In this situation, the sub-CPU 37 changes over the selector 41 to the sub-clock signal side, and supplies the control information to the memory element section 34.

That is, the sub-CPU 37 accesses the nonvolatile memory element 6 and the volatile memory element 7 of the memory element section 34 while the power supply to the main microcomputer 32 stops. The sub-CPU 37 transfers the control information that has been stored in the volatile memory element 7 to the nonvolatile memory element 6, and stores the transferred control information in the nonvolatile memory element 6. When the sub-CPU 37 executes step S28, the sub-CPU 37 copies the control information that is used for the I/O control which is conducted while the operation of the main microcomputer 32 stops (during the intermittent operation mode) to the volatile memory element 40 on the sub-microcomputer 33 side from the volatile memory element 7 (step S29).

Thereafter, the sub-CPU 37 writes in the registers 42 and 43 of the communication control section 38, sets the communication speed to "low speed", and sets up the automatic refresh mode (step S30). Then, the sub-CPU 37 writes in a register for shutting down the power supply of the power supply control section 39 to the memory element section 34 (step S31), and sets itself to the sleep mode (intermittent operation mode) (step S8).

<Process of Sub-Microcomputer 33 During Intermittent Operation Mode>

Figure 14:
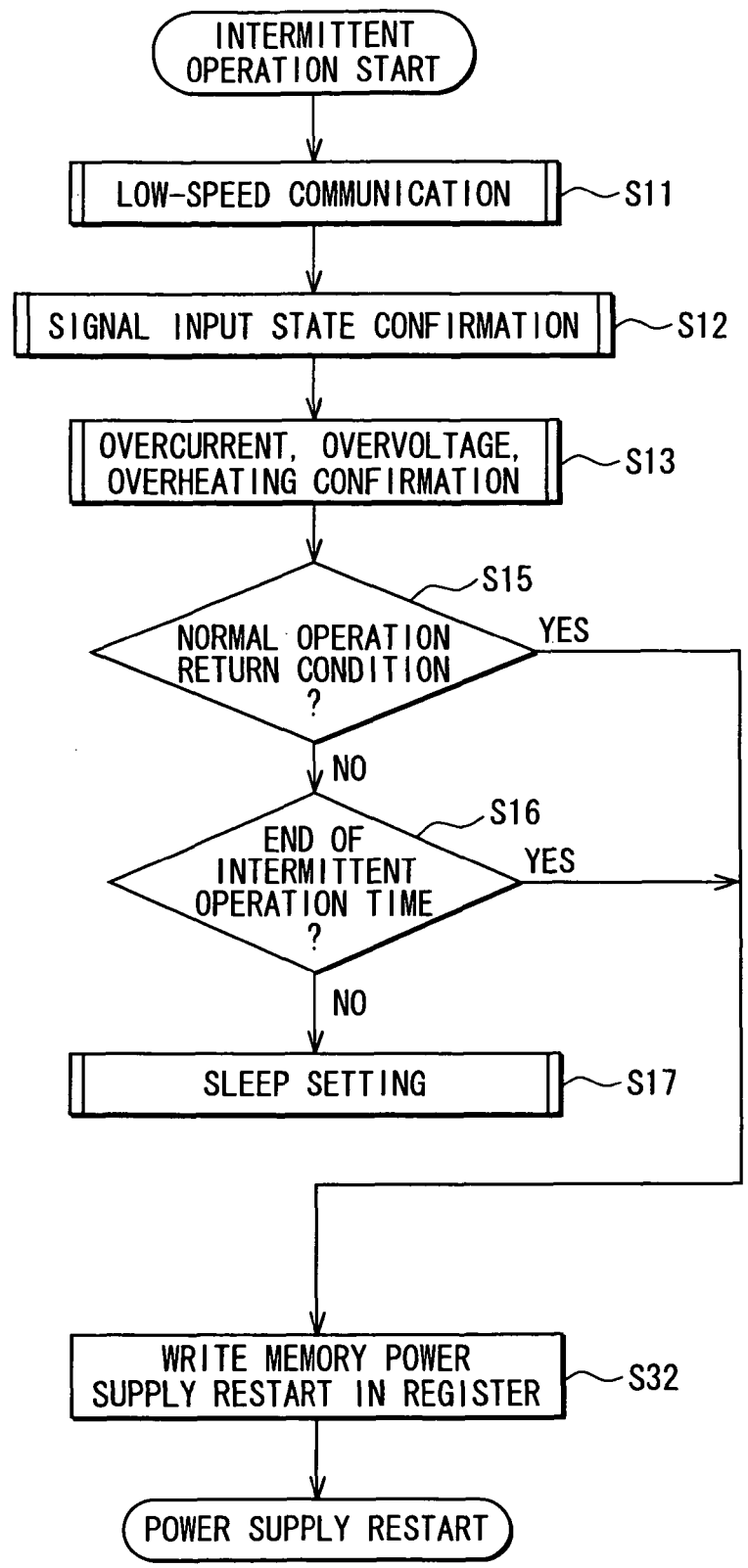
FIG. 14 is a flowchart showing a process when the sub-microcomputer intermittently operates according to the second embodiment.

Referring to FIG. 14, the sub-CPU 37 executes steps S11 to S17 in the same manner as in the first embodiment (FIG. 3 except for step S14). When the sub-CPU 37 determines that any one of steps S15 and S16 is "yes", the sub-CPU 37 writes data for restarting the power supply to the memory element section 34 in the register within the power supply control section 39 (step S32), and shifts from the power supply return operation mode to the normal operation mode.

Even during the period where the sub-CPU 37 operates in the intermittent operation mode, the sub-clock signals are continuously supplied to the communication control section 38, the communication process is conducted in the automatic refresh mode shown in FIG. 11B, and the receive data is periodically overwritten.

<Process of Shifting to Normal Operation Mode>

As shown in FIG. 15A, the main CPU 35 merely conducts the initializing process of step M13. On the other hand, as shown in FIG. 15B, the sub-CPU 37 sets the communication speed of the communication control section 38 to the higher speed side, and sets up the normal operation mode (step S33). As a result, the sub-CPU 37 executes a process corresponding to steps M11 to M16 which has been conducted by the main CPU 4 in the first embodiment (steps S34 to S39).

That is, since the power is supplied to the memory element section 34, the sub-CPU 37 rewrites the control information that has been stored in the nonvolatile memory element 6 in the volatile memory element 7. Then, when step S39 is executed, the sub-CPU 37 copies the control information that is used for the I/O control during the intermittent operation mode to the volatile memory element 7 from the volatile memory element 40 (step S40). Thereafter, the sub-CPU 37 writes data for restarting the power supply to the main microcomputer 32 in the register within the power supply control section 39 (step S41), and shifts to the normal operation mode. The sub-CPU 37 changes over the selector 41 to the main clock signal side before step S41 is executed.

In this example, FIG. 12I shows a change in the current consumption state of the microcomputer system 31 in the case of conducting the above series of processing. The power consumption becomes largest in periods (1) and (6) during which the entire system 34 operates in the normal mode, and its breakdown is represented as follows.

(A) The operating current and leak current of the main microcomputer 32;

(B) The operating current and leak current of the storage element section 34; and (C) The operating current and leak current of the sub-microcomputer 33.

In a process of shifting from the normal operation mode to the intermittent operation mode, because the power supply of the main microcomputer 32 is shut down, the power consumption becomes the total of (B) and (C) in the period (2). In the period (3) during which the mode is shifted to the intermittent operation mode, the power supply of the memory element section 34 is shut down, and the power consumption becomes only (C). In the period during which the supply of the sub-clock signal stops within the sub-microcomputer 33, the power consumption is only the leak current of the sub-microcomputer 33, and the current consumption is the smallest.

In the process of shifting from the intermittent operation mode to the normal operation mode, the power consumption becomes (C) in the period (4) during which the sub-CPU 37 first operates in the continuous mode, and the power consumption becomes the total of (B) and (C) in the period (5) during which the sub-CPU 37 transfers data between the respective memory elements 6, 7 and 40. Then, the power consumption becomes the total of (A) to (C) in the period (6) during which the mode is returned to the normal operation mode.

As described above, according to the second embodiment, when the main CPU 35 determines that its own operation stop condition is satisfied, the main CPU 35 gives the operation stop notification to the sub-CPU 37. When the sub-CPU 37 recognizes the notification, the sub-CPU 37 stops the power supply to the main microcomputer 32. The sub-CPU 37 then writes the control information that has been stored in the volatile memory element 7 at that time in the nonvolatile memory element 6, and stores the control information in the nonvolatile memory element 6. Thereafter, the sub-CPU 37 writes the I/O control information that is used in the power supply stop period of the main microcomputer 32 in the volatile memory element 41 of the sub-microcomputer 33 side, and stores the I/O control information in the volatile memory element 41. Then, the sub-CPU 37 stops the power supply to the memory element section 34. Thereafter, the sub-CPU 37 sets the sub-oscillator circuit 21 in the intermittent mode, and checks whether the operation start condition of the main microcomputer 33 has been satisfied in the period during which the sub-clock signal is supplied, or not.

When the operation start condition is satisfied, the sub-CPU 37 changes over the sub-oscillator circuit 21 to the continuous mode to restart the power supply to the memory element section 34. Then, the sub-CPU 37 rewrites the control information that has been stored in the nonvolatile memory element 6 in the volatile memory element 7. The sub-CPU 37 also rewrites the I/O control information that has been used in the power supply stop period of the main microcomputer 32 which has been stored in the volatile memory element 41 on the sub-microcomputer side in the volatile memory element 7, and then restarts the power supply to the main microcomputer 32. When the main CPU 33 starts upon restarting the power supply, the main CPU 33 executes the processing based on the control information.

Accordingly, since the data transfer between the volatile memory element 7 and the nonvolatile memory element 6 which has been conducted by the main CPU 4 in the first embodiment is conducted by the sub-CPU 37, the power supply to the main microcomputer 32 can be stopped more quickly. In this case, the nonvolatile memory element 6 is formed of a flash memory that needs relatively long time in a period of time required for reading and writing the data. As a result, the data transfer is conducted by the sub-microcomputer 33 that is relatively small in the power consumption, thereby making it possible to suppress the power consumption.

Also, when the sub-CPU 37 writes the entire control information in the nonvolatile memory element 6, the sub-CPU 37 writes "writing completed information" together. In the case where "writing completed information" has not been stored in the nonvolatile memory element 6 when the power supply restarts to start the sub-CPU 37, the sub-CPU 37 executes the initialization without reading the control information, thereby obtaining the same advantages as those in the first embodiment.

Further, the communication control section 38 periodically receives the control information that has been stored in the I/O control section 11 while the power supply to the main microcomputer 32 stops, and the sub-CPU 37 operates in the intermittent operation mode. As a result, when the main CPU 35 starts, the communication control section 38 can acquire the latest I/O control information immediately after acquiring that information.

The present invention is not limited to only the embodiments that have been described and shown in the figures, but the following modifications or expansions are enabled.

The main microcomputer 2 can control the power supply to at least a part of the structural elements.

A configuration in which the sub-microcomputer 3 side intermittently operates can be provided as the occasion demands, and the sub-microcomputer 3 can be configured to continuously operate in a period where the operation of the main microcomputer 2 stops.

The main microcomputer 2 and the sub-microcomputer 3 can be different from each other in the operating power supply. In this case, it is possible that the power supply control section 24 is replaced with a series regulator that develops the supply voltages corresponding to the main microcomputer 2 and the sub-microcomputer 3, respectively, and the operation of the series regulator is controlled to control the power supply to the main microcomputer 2.

When the I/O control section 12 is mounted as a part of the microcomputer system, the communication control section 10 is not required.

The process of storing the data indicative of "under writing" in the nonvolatile memory element 6 can be conducted as the occasion demands.

The nonvolatile memory element 6 can be formed of a memory such as an EEPROM or an FROM (registered trademark).

When the power supply to the main microcomputer 2 stops, the process of storing the control information in the nonvolatile memory element 6 can be conducted as the occasion demands. When the power supply restarts, the processing can start from "initialization" of step M1 each time.

It is possible that the input side of the power supply control section 24 is equipped with a charge pump circuit, and the charge pump circuit operates to increase the voltage when the voltage drop of the power supply VDD is generated, so as to ensure the processing time on the main microcomputer 2 side.

The process that copes with a case where the drop of the supply voltage is detected can be conducted as the occasion demands. Only the detection of the drop of the power supply can be set as the operation stop condition.

Communications between the microcomputer system 1 and the I/O section 11 can be conducted by a half duplex serial communication.

In the second embodiment, the automatic refresh process of the communication control section 38 can be conducted as the occasion demands.

Also, in the second embodiment, any one of the process of shifting to the intermittent operation mode and the process of shifting to the normal operation mode can be conducted by the main CPU 35.

The present invention is not limited to the electronic control of the in-vehicle device, but can be widely applied to other applications that are required to reduce the power consumption.

What is claimed is:

1. A microcomputer system comprising:
    a main CPU section including a main CPU that operates upon receiving a main clock signal;
    a sub-CPU section including a sub-CPU, the sub-CPU section having a smaller number of circuit gates than the main CPU section;
    a sub-oscillator circuit that oscillates and outputs a sub-clock signal, which has a frequency lower than that of the main clock signal and is supplied to the sub-CPU section, the sub-oscillator circuit being configured to change over between a continuous mode for continuous oscillation and an intermittent mode for intermittent oscillation; and
    a power supply control circuit that is mounted in the sub-CPU section, and controls a power supply to at least a part of the main CPU section,
    wherein the main CPU is configured to give an operation stop notification to the sub-CPU when the main CPU determines that an operation stop condition of the main CPU is satisfied,
    wherein the sub-CPU is configured to stop the power supply to at least a part of the main CPU section and set the sub-oscillator circuit to the intermittent mode when the sub-CPU recognizes the operation stop notification,
    wherein the sub-CPU is configured to check whether an operation start condition of the main CPU section is satisfied in a period where the sub-clock signal is supplied, and
    wherein the sub-CPU is configured to change over the sub-oscillator circuit to the continuous mode, and restart the power supply to at least a part of the main CPU section when the operation start condition is satisfied.

2. The microcomputer system according to claim 1, further comprising:
    a voltage drop detecting circuit that detects a drop of the power supply to at least a part of the main CPU section,
    wherein the main CPU determines that the operation stop condition is satisfied when the drop of the power supply to at least a part of the main CPU section is detected.

3. The microcomputer system according to claim 1, wherein:
    the sub-CPU conducts an I/O control while the power supply to at least a part of the main CPU section is stopped.

4. The microcomputer system according to claim 3, further comprising:
    a communication control section that is mounted on the sub-CPU section and communicates with an I/O control section for controlling input and output of signals with respect to components external to the microcomputer system,
    wherein the sub-CPU sets a communication speed of the communication control section to a lower speed when the power supply to at least a part of the main CPU section is stopped, and sets the communication speed to a higher speed while the power supply to at least a part of the main CPU section is provided, and
    wherein the sub-CPU checks whether the operation start condition of the main CPU section is satisfied upon control information being acquired through the communication control section from the I/O control section in a period during which the power supply to at least a part of the main CPU section is stopped.

5. The microcomputer system according to claim 4, wherein:
the communication control section is configured to acquire the control information from the I/O control section by periodic transfer in the period during which the power supply to at least a part of the main CPU section is stopped.

6. A microcomputer system comprising:
a main CPU section including a main CPU that operates upon receiving a main clock signal;
a main nonvolatile memory element that is mounted on the main CPU section;
a main volatile memory element that is mounted on the main CPU section, and in which control information is stored by the main CPU;
a sub-CPU section including a sub-CPU, the sub-CPU section having a smaller number of circuit gates than the main CPU section;
a sub-oscillator circuit that oscillates and outputs a sub-clock signal, which has a frequency lower than that of the main clock signal and is supplied to the sub-CPU section, the sub-oscillator circuit being configured to change over between a continuous mode for continuous oscillation and an intermittent mode for intermittent oscillation; and
a power supply control circuit that is mounted in the sub-CPU section, and controls a power supply to at least a part of the main CPU section,
wherein the main CPU is configured to, when the main CPU determines that an operation stop condition of the main CPU is satisfied, write and store the control information that is stored in the main volatile memory element in the main nonvolatile memory element, and give an operation stop notification to the sub-CPU,
wherein the sub-CPU is configured to stop the power supply to at least a part of the main CPU section and set the sub-oscillator circuit to an intermittent mode, when the sub-CPU recognizes the operation stop notification,
wherein the sub-CPU is configured to check whether an operation start condition of the main CPU section is satisfied in a period where the sub-clock signal is supplied,
wherein, the sub-CPU is configured to change over the sub-oscillator circuit to the continuous mode and restart the power supply to at least a part of the main CPU section, when the operation start condition is satisfied, and
wherein the main CPU is configured to rewrite the control information that is stored in the main nonvolatile memory element in the main volatile memory element, and execute processing based on the control information, when the main CPU starts upon restarting of the power supply.

7. The microcomputer system according to claim 6, wherein:
the main CPU is configured to, when the main CPU completes writing all the control information in the main nonvolatile memory element when the main CPU determines that an operation stop condition of the main CPU is satisfied, also write data indicative that writing has been completed in the main nonvolatile memory element, and
wherein the main CPU is configured to execute initialization without reading the control information stored in the main nonvolatile memory element in the case where the data indicative that writing has been completed is not stored in the main nonvolatile memory element, when the sub-CPU restarts the power supply to at least a part of the main CPU section.

8. The microcomputer system according to claim 6, further comprising:
a voltage drop detecting circuit that detects a drop of the power supply to at least a part of the main CPU section,
wherein the main CPU determines that the operation stop condition is satisfied when the drop of the power supply to at least a part of the main CPU section is detected.

9. The microcomputer system according to claim 6, wherein:
the sub-CPU conducts an I/O control while the power supply to at least a part of the main CPU section is stopped.

10. The microcomputer system according to claim 9, further comprising:
a communication control section that is mounted on the sub-CPU section and communicates with an I/O control section for controlling input and output of signals with respect to components external to the microcomputer system,
wherein the sub-CPU sets a communication speed of the communication control section to a lower speed when the power supply to at least a part of the main CPU section is stopped, and sets the communication speed to a higher speed while the power supply to at least a part of the main CPU section is provided, and
wherein the sub-CPU checks whether the operation start condition of the main CPU section is satisfied upon control information being acquired through the communication control section from the I/O control section in a period during which the power supply to at least a part of the main CPU section is stopped.

11. The microcomputer system according to claim 10, wherein:
the communication control section is configured to acquire the control information from the I/O control section by periodic transfer in the period during which the power supply to at least a part of the main CPU section is stopped.

12. A microcomputer system comprising:
a main CPU section including a main CPU that operates upon receiving a main clock signal;
a sub-CPU section including a sub-CPU, the sub-CPU section having a smaller number of circuit gates than the main CPU section;
a sub-oscillator circuit that oscillates and outputs a sub-clock signal, which has a frequency lower than that of the main clock signal and is supplied to the sub-CPU section, the sub-oscillator circuit being configured to change over between a continuous mode for continuous oscillation and an intermittent mode for intermittent oscillation;
a main volatile memory element in which control information is stored by the main CPU, and which is accessible by both of the main CPU and the sub-CPU;
a main nonvolatile memory element that is accessible by both of the main CPU and the sub-CPU;
a sub-volatile memory element in which I/O control information is stored by the sub-CPU, and which has a storage capacity smaller than that of the main volatile memory element; and
a power supply control circuit that is mounted in the sub-CPU section, controls a power supply to at least a part of the main CPU section, and controls a power supply to the main volatile memory element and the main nonvolatile memory element, wherein the main CPU is configured to give an operation stop notification to the sub-CPU, when the main CPU determines that an operation stop condition of the main CPU is satisfied, wherein the sub-CPU is configured to, when the sub CPU recognizes the operation stop notification, stop the power supply to at least a part of the main CPU section, write and store the control information that is stored in the main volatile memory element in the main nonvolatile memory element, write and store the I/O control information, which is used while the power supply to at least a part of the main CPU section stops, in the sub-volatile memory element, and thereafter stop the power supply to the main volatile memory element and the main nonvolatile memory element, set the sub-oscillator circuit to an intermittent mode, and check whether an operation start condition of the main CPU section is satisfied in a period during which the sub-clock signal is supplied, wherein the sub-CPU is configured to, when the operation start condition is satisfied, change over the sub-oscillator circuit to the continuous mode, restart the power supply to the main volatile memory element and the main nonvolatile memory element, rewrite the control information that is stored in the main nonvolatile memory element in the main volatile memory element, rewrite the I/O control information that is used while the power supply to the main CPU section is stopped in the main volatile memory element, and thereafter restart the power supply to the main CPU section, and wherein the main CPU is configured to execute a process based on the rewritten control information, when the main CPU starts upon restating the power supply.

13. The microcomputer system according to claim 12, wherein:

the sub-CPU is configured to, when the sub-CPU completes writing all the control information in the main nonvolatile memory element when the sub-CPU recognizes the operation stop notification, also write data indicative that writing has been completed in the main nonvolatile memory element, and wherein the main CPU is configured to execute initialization without reading the control information stored in the main nonvolatile memory element in the case where the data indicative that writing has been completed is not stored in the main nonvolatile memory element, when the sub-CPU restarts the power supply to at least a part of the main CPU section.

14. The microcomputer system according to claim 12, wherein:

the main nonvolatile memory element includes a flash memory.

15. The microcomputer system according to claim 12, further comprising:

a voltage drop detecting circuit that detects a drop of the power supply to at least a part of the main CPU section, wherein the main CPU determines that the operation stop condition is satisfied when the drop of the power supply to at least a part of the main CPU section is detected.

16. The microcomputer system according to claim 12, wherein:

the sub-CPU conducts an I/O control, based on the I/O control information stored in the sub-volatile memory element, while the power supply to at least a part of the main CPU section is stopped.

17. The microcomputer system according to claim 16, further comprising:

a communication control section that is mounted on the sub-CPU section and communicates with an I/O control section for controlling input and output of signals with respect to components external to the microcomputer system, wherein the sub-CPU sets a communication speed of the communication control section to a lower speed when the power supply to at least a part of the main CPU section is stopped, and sets the communication speed to a higher speed while the power supply to at least a part of the main CPU section is provided, and wherein the sub-CPU checks whether the operation start condition of the main CPU section is satisfied upon control information being acquired through the communication control section from the I/O control section in a period during which the power supply to at least a part of the main CPU section is stopped.

18. The microcomputer system according to claim 17, wherein:

the communication control section is configured to acquire the control information from the I/O control section by periodic transfer in the period during which the power supply to at least a part of the main CPU section is stopped.

19. A microcomputer system comprising:

a main CPU section including a main CPU that operates upon receiving a main clock signal;

a sub-CPU section including a sub-CPU, the sub-CPU section having a smaller number of circuit gates than the main CPU section;

a sub-oscillator circuit that oscillates and outputs a sub-clock signal, which has a frequency lower than that of the main clock signal and is supplied to the sub-CPU section;

a main volatile memory element in which control information is stored by the main CPU, and which is accessible by both of the main CPU and the sub-CPU;

a main nonvolatile memory element that is accessible by both of the main CPU and the sub-CPU;

a sub-volatile memory element in which I/O control information is stored by the sub-CPU, and which has a storage capacity smaller than that of the main volatile memory element; and a power supply control circuit that is mounted in the sub-CPU section, controls a power supply to at least a part of the main CPU section, and controls a power supply to the main volatile memory element and the main nonvolatile memory element, wherein the main CPU gives an operation stop notification to the sub-CPU, when the main CPU determines that an operation stop condition of the main CPU is satisfied, and wherein the sub-CPU is configured to, when the sub-CPU recognizes the operation stop notification, stop the power supply to at least a part of the main CPU section, write and store the control information that is stored in the main volatile memory element in the main nonvolatile memory element, write and store the I/O control information, which is used while the power supply to at least a part of the main CPU section stops, in the sub-volatile memory element, and thereafter stop the power supply to the main volatile memory element and the main nonvolatile memory element.

20. The microcomputer system according to claim 19, wherein:
the sub-CPU is configured to, when the sub-CPU completes writing all the control information in the main nonvolatile memory element when the sub-CPU recognizes the operation stop notification, also write data indicative that writing has been completed in the main nonvolatile memory element, and
wherein the main CPU is configured to execute initialization without reading the control information stored in the main nonvolatile memory element in the case where the data indicative that writing has been completed is not stored in the main nonvolatile memory element, when power is restarted to at least a part of the main CPU section.

21. The microcomputer system according to claim 19, wherein:
the main nonvolatile memory element includes a flash memory.

22. The microcomputer system according to claim 19, further comprising:
a voltage drop detecting circuit that detects a drop of the power supply to at least a part of the CPU section,
wherein the main CPU determines that the operation stop condition is satisfied when the drop of the power supply to at least a part of the main CPU section is detected.

23. The microcomputer system according to claim 19, wherein:
the sub-CPU conducts an I/O control, based on the I/O control information stored in the sub-volatile memory element, while the power supply to at least a part of the main CPU section is stopped.

24. The microcomputer system according to claim 23, wherein:
the sub-CPU is configured to check whether an operation start condition of the main CPU section is satisfied while the power supply to at least a part of the main CPU section stops, and
the microcomputer system further comprises a communication control section that is mounted on the sub-CPU section and communicates with an I/O control section for controlling input and output of signals with respect to components external to the microcomputer system,
wherein the sub-CPU sets a communication speed of the communication control section to a lower speed when the power supply to at least a part of the main CPU section is stopped, and sets the communication speed to a higher speed while the power supply to at least a part of the main CPU section is provided, and
wherein the sub-CPU checks whether the operation start condition of the main CPU section is satisfied upon control information being acquired through the communication control section from the I/O control section in a period during which the power supply to at least a part of the main CPU section is stopped.

25. The microcomputer system according to claim 24, wherein:
the communication control section is configured to acquire the control information from the I/O control section by periodic transfer in the period during which the power supply to at least a part of the main CPU section is stopped.

26. A microcomputer system comprising:
a main CPU section including a main CPU that operates upon receiving a main clock signal;
a sub-CPU section including a sub-CPU, the sub-CPU section having a smaller number of circuit gates than the main CPU section;
a sub-oscillator circuit that oscillates and outputs a sub-clock signal, which has a frequency lower than that of the main clock signal and is supplied to the sub-CPU section;
a main volatile memory element in which control information is stored by the main CPU, and which is accessible by both of the main CPU and the sub-CPU;
a main nonvolatile memory element that is accessible by both of the main CPU and the sub-CPU;
a sub-volatile memory element in which I/O control information is stored by the sub-CPU, and which has a storage capacity smaller than that of the main volatile memory element, and
a power supply control circuit that is mounted in the sub-CPU section, controls a power supply to at least a part of the main CPU section, and controls a power supply to the main volatile memory element and the main nonvolatile memory element,
wherein the sub-CPU is configured to check whether an operation start condition of the main CPU section is satisfied while the power supply to at least a part of the main CPU section and a power supply to the main volatile memory element and the main nonvolatile memory element are stopped,
wherein the sub-CPU is configured to, when the operation start condition is satisfied, restart the power supply to the main volatile memory element and the main nonvolatile memory element, rewrite the control information, which had been previously written and stored in the main nonvolatile memory element, in the main volatile memory element, rewrite the I/O control information, which is used while the power supply to at least the main part of the CPU section stops and is stored in the sub-volatile memory element, in the main volatile memory element, and thereafter restart the power supply to at least the main part of the CPU section, and
wherein the main CPU is configured to execute a process based on the rewritten control information stored in the main volatile element when the power supply to the main CPU is restarted.

27. The microcomputer system according to claim 26, wherein:
the sub-CPU is configured to
when the power supply to at least a part of the main CPU section and a power supply to the main volatile memory element and the main nonvolatile memory element are stopped, write the control information stored in volatile memory element into the main nonvolatile memory element as the control information which had been previously written and stored in the main nonvolatile memory element,
when the sub-CPU completes writing all the control information in the main nonvolatile memory element, write data indicative that writing has been completed in the main nonvolatile memory element, and
wherein the main CPU is configured to execute initialization without reading the control information stored in the main nonvolatile memory element in the case where the data indicative that writing has been completed is not stored in the main nonvolatile memory element, when the sub-CPU restarts the power supply to at least a part of the main CPU section.

28. The microcomputer system according to claim 26, wherein:

the main nonvolatile memory element includes a flash memory.

29. The microcomputer system according to claim 26, further comprising:
a voltage drop detecting circuit that detects a drop of the power supply to at least a part of the main CPU section,
wherein the power supply to the main volatile memory element and the main nonvolatile memory element are stopped when the drop of the power supply to at least a part of the main CPU section is detected.

30. The microcomputer system according to claim 26, wherein:
the sub-CPU conducts an I/O control, based on the I/O control information stored in the sub-volatile memory element, while the power supply to at least a part of the main CPU section is stopped.

31. The microcomputer system according to claim 30, further comprising:
a communication control section that is mounted on the sub-CPU section and communicates with an I/O control section for controlling input and output of signals with respect to components external to the microcomputer system,
wherein the sub-CPU sets a communication speed of the communication control section to a lower speed when the power supply to at least a part of the main CPU section is stopped, and sets the communication speed to a higher speed while the power supply to at least a part of the main CPU section is provided, and
wherein the sub-CPU checks whether the operation start condition of the main CPU section is satisfied upon control information being acquired through the communication control section from the I/O control section in a period during which the power supply to at least a part of the main CPU section is stopped.

32. The microcomputer system according to claim 31, wherein:
the communication control section is configured to acquire the control information from the I/O control section by periodic transfer in the period during which the power supply to at least a part of the main CPU section is stopped.

* * * * *